(12) United States Patent
Nelson et al.

(10) Patent No.: US 9,242,199 B2
(45) Date of Patent: Jan. 26, 2016

(54) AIR FILTER ARRANGEMENT; AIR CLEANER ASSEMBLY; AND, METHODS

(71) Applicant: DONALSON COMPANY, INC., Minneapolis, MN (US)

(72) Inventors: Benny Kevin Nelson, Bloomington, MN (US); David W. Nelson, Coon Rapids, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 14/230,148

(22) Filed: Mar. 31, 2014

(65) Prior Publication Data
US 2015/0068175 A1 Mar. 12, 2015

Related U.S. Application Data

(63) Continuation of application No. 12/449,809, filed as application No. PCT/US2008/054725 on Feb. 22, 2008, now Pat. No. 8,685,130.

(60) Provisional application No. 60/903,387, filed on Feb. 26, 2007.

(51) Int. Cl.
*B01D 46/00* (2006.01)
*B01D 46/52* (2006.01)

(52) U.S. Cl.
CPC .......... *B01D 46/0005* (2013.01); *B01D 46/522* (2013.01); *B01D 46/525* (2013.01); *B01D 46/526* (2013.01); *B01D 2275/206* (2013.01); *B01D 2279/60* (2013.01)

(58) Field of Classification Search
CPC ........... B01D 46/0004; B01D 46/0005; B01D 46/0006; B01D 46/525; B01D 46/526; B01D 46/527; B01D 2275/206; B01D 2279/60
USPC .................................................. 55/480, 481
See application file for complete search history.

(56) References Cited

U.S. PATENT DOCUMENTS

| | | |
|---|---|---|
| 4,589,983 A | 5/1986 | Wydevan |
| 5,622,583 A | 4/1997 | Ernst et al. |
| 5,772,883 A | 6/1998 | Rothman et al. |
| 5,792,247 A | 8/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,048,386 A | 4/2000 | Gillingham et al. |
| D425,189 S | 5/2000 | Gillingham et al. |

(Continued)

FOREIGN PATENT DOCUMENTS

| | | |
|---|---|---|
| DE | 43 28 846 | 3/1995 |
| DE | 10 2004 058 590 | 8/2006 |
| JP | H11-034189 A | 2/2009 |

OTHER PUBLICATIONS

Pending claims corresponding to U.S. Appl. No. 14/280,924 as of Sep. 23, 2014.

*Primary Examiner* — Robert Clemente
(74) *Attorney, Agent, or Firm* — Merchant & Gould, P.C.

(57) ABSTRACT

A media pack for including in a filter cartridge of an air filter arrangement, is provided. A variety of configurations for the media pack are described and shown, an example shown being trapezoidal. Filter cartridges including such media packs, air cleaner assemblies and equipment systems are described. Also methods of use assembly are described.

20 Claims, 19 Drawing Sheets

(56) References Cited

U.S. PATENT DOCUMENTS

| | | |
|---|---|---|
| 6,179,890 B1 | 1/2001 | Ramos et al. |
| 6,273,938 B1 | 8/2001 | Fanselow et al. |
| 6,966,940 B2 | 11/2005 | Krisko et al. |
| 7,001,450 B2 | 2/2006 | Gieseke et al. |
| 7,329,326 B2 | 2/2008 | Wagner et al. |
| 7,351,270 B2 | 4/2008 | Olson et al. |
| 7,364,601 B2 | 4/2008 | Xu et al. |
| 7,625,419 B2 | 12/2009 | Nelson et al. |
| 7,674,308 B2 | 3/2010 | Krisko et al. |
| 7,967,886 B2 | 6/2011 | Schrage et al. |
| 7,972,405 B2 | 7/2011 | Engelland et al. |
| 8,034,145 B2 | 10/2011 | Boehrs et al. |
| 8,048,188 B2 | 11/2011 | Widerski et al. |
| 8,163,057 B2 | 4/2012 | Blossey et al. |
| 8,241,383 B2 | 8/2012 | Schrage et al. |
| 8,277,532 B2 | 10/2012 | Reichter et al. |
| 8,292,983 B2 | 10/2012 | Recihter et al. |
| 8,357,219 B2 | 1/2013 | Boehrs et al. |
| 8,496,723 B2 | 7/2013 | Reichter et al. |
| 8,685,130 B2 | 4/2014 | Nelson et al. |
| 8,728,193 B2 | 5/2014 | Flagstad et al. |
| 2004/0035096 A1 | 2/2004 | Ham |
| 2004/0040271 A1* | 3/2004 | Kopec ............... B01D 46/0004 55/357 |
| 2004/0093858 A1 | 5/2004 | Aoki |
| 2008/0022641 A1* | 1/2008 | Engelland ......... B01D 46/0004 55/521 |
| 2008/0250763 A1* | 10/2008 | Widerski ........... B01D 46/0005 55/357 |
| 2008/0307759 A1 | 12/2008 | Reichter et al. |
| 2009/0064646 A1 | 3/2009 | Reichter et al. |
| 2009/0151311 A1 | 6/2009 | Reichter et al. |
| 2010/0043366 A1 | 2/2010 | Boehrs et al. |
| 2012/0110962 A1* | 5/2012 | Dewit ............... B01D 46/0005 55/357 |

\* cited by examiner

AIR FILTER ARRANGEMENT; AIR CLEANER ASSEMBLY; AND, METHODS

This application is a continuation application of U.S. Ser. No. 12/449,809, filed Mar. 2, 2010, which has now issued as U.S. Pat. No. 8,685,130, as a National Stage of PCT/US2008/054725 filed Feb. 22, 2008, with a claim of priority to U.S. Ser. No. 60/903,387, filed Feb. 26, 2007. A claim of priority, to the extent appropriate, to each of U.S. Ser. No. 12/449,809; PCT/US2008/054725 and U.S. Ser. No. 60/903,387 is made. The complete disclosures of U.S. Ser. No. 12/449,809; PCT/US2008/054725; and U.S. Ser. No. 60/903,387 are incorporated herein by reference.

FIELD OF THE DISCLOSURE

The present disclosure relates to filter arrangements for use in filtering gases. The disclosure particularly relates to media packs that use z-filter media as characterized herein. Z-filter media generally comprises fluted media secured to facing media, formed into a media pack. More specifically, the disclosure relates to such media packs and their inclusion in serviceable air filter cartridges for use in air cleaners. Air cleaner arrangements and methods of assembly and use are also described.

BACKGROUND

Air streams can carry contaminant material therein. In many instances, it is desired to filter some or all of the contaminant material from the air stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) the air. A variety of air filter arrangements have been developed for contaminant rejection. Improvements are sought.

SUMMARY

According to present disclosure, features, techniques and components are provided for use in air cleaner assemblies and components therefor. Described are media packs comprising media strips including fluted media sheets secured to facing media sheets, sometimes referred herein as z-filter media constructions. Certain of the described techniques relate to providing media packs of unique shapes, for convenience. An example unique shape is provided, in the form of a media pack with a trapezoidal perimeter shape, when viewed toward an inlet flow face or an outlet flow face of the media pack.

Filter cartridges incorporating such media packs, air cleaner assemblies incorporating them, and equipment systems incorporating such air cleaners, are described.

Also, new and advantageous features for air cleaners are described.

DETAILED DESCRIPTION

I. Z-Filter Media Configurations, Generally

Figure 1:
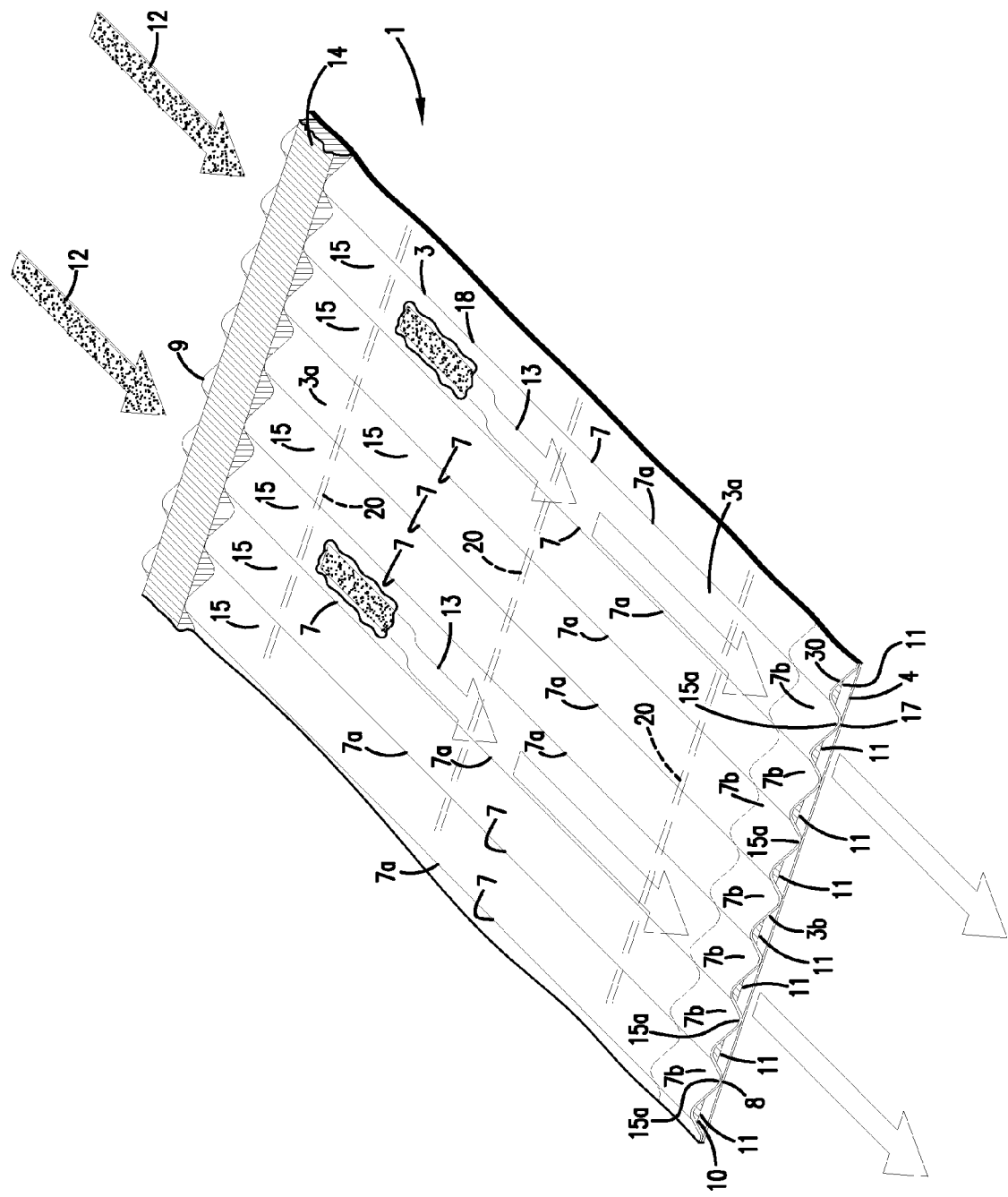
FIG. 1 is a fragmentary, schematic, perspective view of z-filter media useable in arrangements according to the present disclosure.

Fluted filter media can be used to provide fluid filter constructions in a variety of manners. One well known manner is characterized herein as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364;

5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked on one another, to create a filter construction. An example of this is described in FIG. 11 of U.S. Pat. No. 5,820,646, incorporated herein by reference.

Herein, strips of material comprising fluted sheet secured to corrugated sheet, which is then assembled into stacks to form media packs, are sometimes referred to as "single facer strips". The term "single facer strip" and variants thereof, is meant to refer to a fact that one face, i.e., a single face, fluted (typically corrugated) sheet, is faced by the facing sheet, in the strip.

Typically, coiling of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; or, a media pack constructed or formed from such media into a three dimensional network of inlet and outlet flutes; and/or, a filter cartridge or construction including such a media pack.

In FIG. 1, an example of media 1 useable in z-filter media is shown. The media 1 is formed from a fluted, in this instance corrugated, sheet 3 and a facing sheet 4. A construction such as media 1 is deferred to herein as a single facer or single facer strip.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations are generally straight. By "straight" in this context, it is meant that through at least 70%, typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end for the media pack and edge 8 an outlet end, although an opposite orientation is possible.

Adjacent edge 8 is provided a sealant bead 10, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided seal bead 14. Seal bead 14 generally closes flutes 15 to passage of unfiltered fluid therein, adjacent edge 9. Bead 14 would typically be applied as strips of the media 1 are secured to one another during stacking. Thus bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from media 1, not depicted herein, it is referenced as a "winding bead.")

Referring to FIG. 1, once the media 1 is incorporated into a media pack, for example by stacking, it can be operated as follows. First, air in the direction of arrows 12, would enter open flutes 11 adjacent end 9. Due to the closure at end 8, by bead 10, the air would pass through the media, for example as shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising stacking bead.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes and sealant for flute seals, large sealant surface areas (and volume) at both the upstream end and the downstream end are needed. High quality seals at these locations are critical to proper operation of the media structure that results. The high sealant volume and area, creates issues with respect to this.

Figure 2:
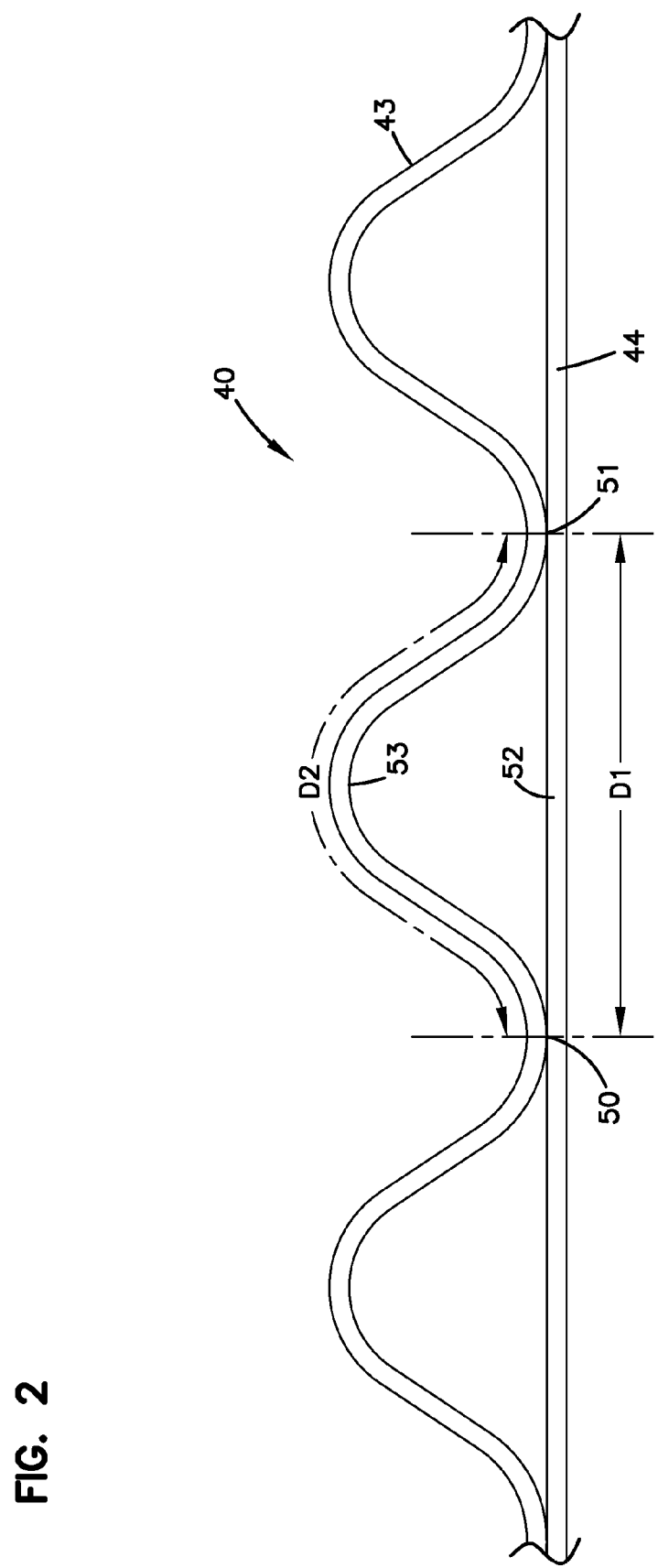
FIG. 2 is an enlarged, schematic, cross-sectional view of a portion of the media depicted in FIG. 1.

Attention is now directed to FIG. 2, in which a z-filter media construction 40 utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
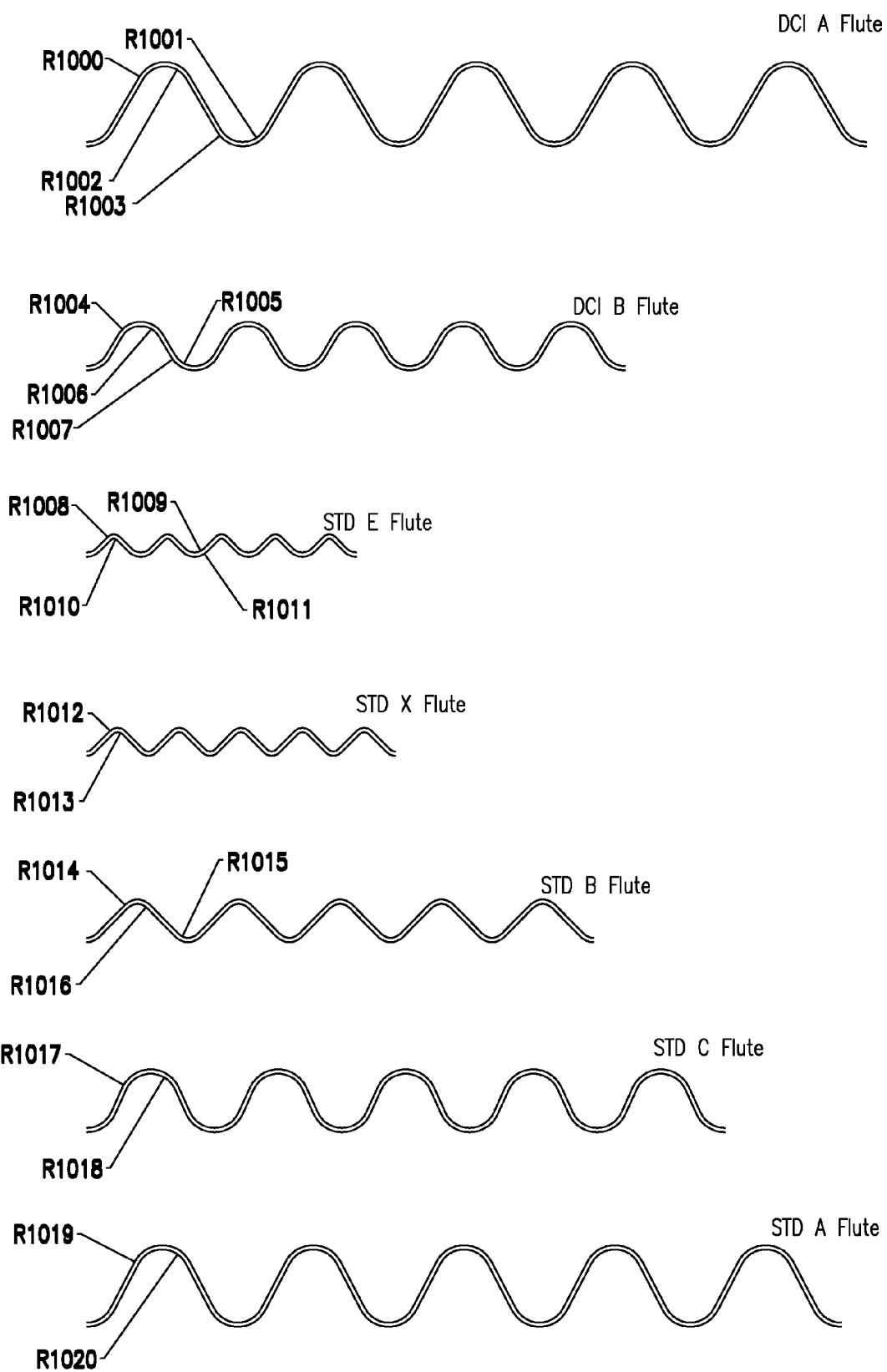
FIG. 3 includes schematic views of examples of various fluted media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows:<br>R1000 = .0675 inch (1.715 mm); R1001 = .0581 inch (1.476 mm);<br>R1002 = .0575 inch (1.461 mm); R1003 = .0681 inch (1.730 mm); |
| DCI B Flute: | Flute/flat = 1.32:1; The Radii (R) are as follows:<br>R1004 = .0600 inch (1.524 mm); R1005 = .0520 inch (1.321 mm);<br>R1006 = .0500 inch (1.270 mm); R1007 = .0620 inch (1.575 mm); |
| Std. E Flute: | Flute/flat = 1.24:1; The Radii (R) are as follows:<br>R1008 = .0200 inch (.508 mm); R1009 = .0300 inch (.762 mm);<br>R1010 = .0100 inch (.254 mm); R1011 = .0400 inch (1.016 mm); |
| Std. X Flute: | Flute/flat = 1.29:1; The Radii (R) are as follows:<br>R1012 = .0250 inch (.635 mm); R1013 = .0150 inch (.381 mm); |
| Std. B Flute: | Flute/flat = 1.29:1; The Radii (R) are as follows:<br>R1014 = .0410 inch (1.041 mm); R1015 = .0310 inch (.7874 mm);<br>R1016 = .0310 inch (.7874 mm); |
| Std. C Flute: | Flute/flat = 1.46:1; The Radii (R) are as follows:<br>R1017 = .0720 inch (1.829 mm); R1018 = .0620 inch (1.575 mm); |
| Std. A Flute: | Flute/flat = 1.53:1; The Radii (R) are as follows:<br>R1019 = .0720 inch (1.829 mm); R1020 = .0620 inch (1.575 mm) |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Stacked Media Configurations Using Fluted Media, Generally

Figure 4:
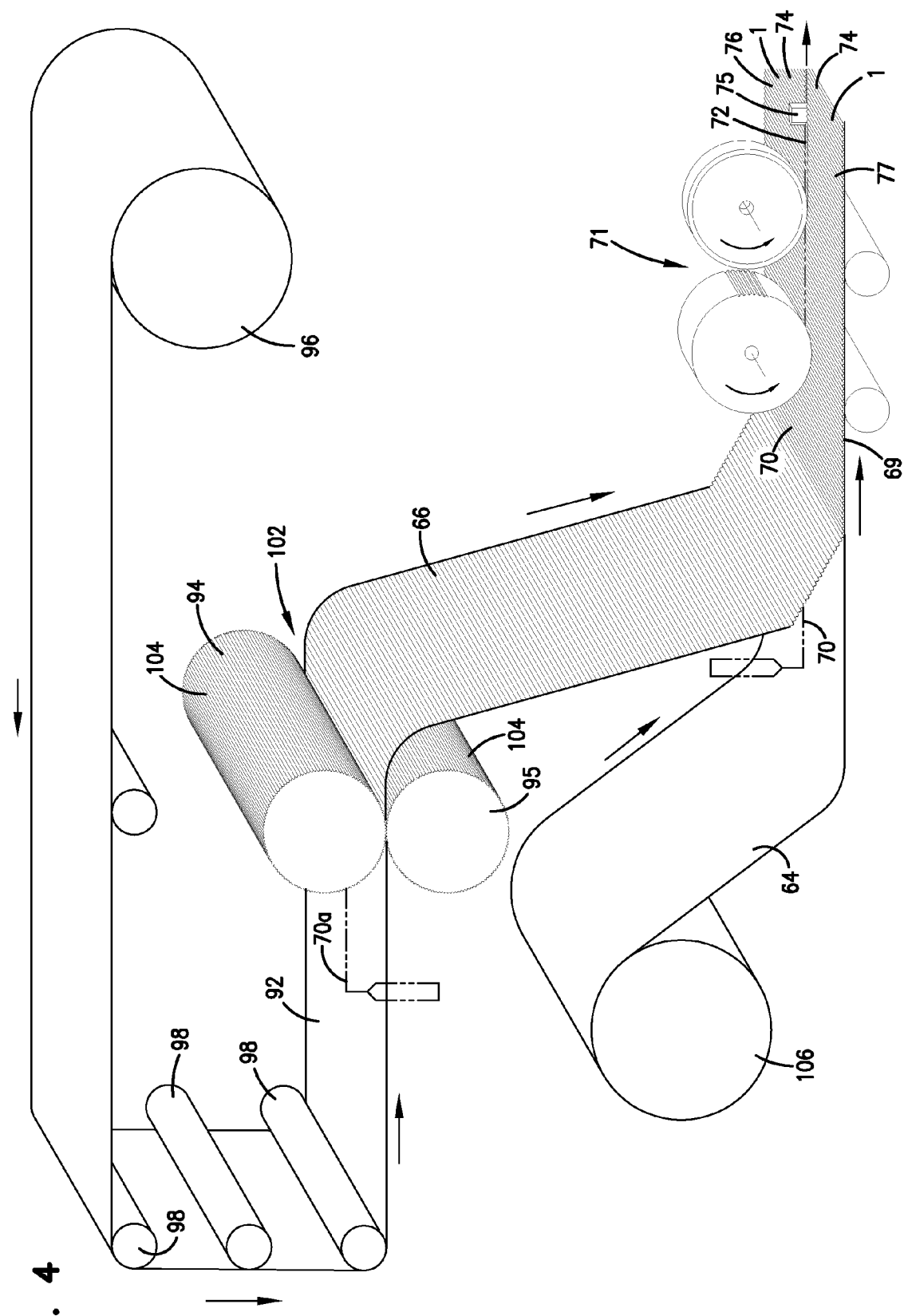
FIG. 4 is a schematic view of an example process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 14, FIG. 1.

The term "single facer bead" meaning a sealant bead positioned between layers of a single facer; i.e., between the fluted sheet and facing sheet.

An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, into single facer strips for stacking, as described below in connection with FIG. 6.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 the media 74 must be formed. In the schematic shown in FIG. 4, this is done by passing a flat sheet of media 92 through a pair of corrugation rollers 94, 95. In the schematic shown in FIG. 4, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated (i.e., fluted) media sheet 66 is then secured to facing media sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One typical type of flute pattern will be a regular, typically curved, wave pattern corrugation, of straight flutes, as defined herein above. A typical regular curved wave pattern used, would be one in which the distance D2, as defined above, in a corrugated pattern is at least 1.2 times the distance D1 as defined above. In one typical application, typically D2=1.25-1.35×D1; in another D2=1.4-1.6×D1. In some instances the techniques may be applied with curved wave patterns that are not "regular," including, for example, ones that do not use straight flutes.

Figure 5:
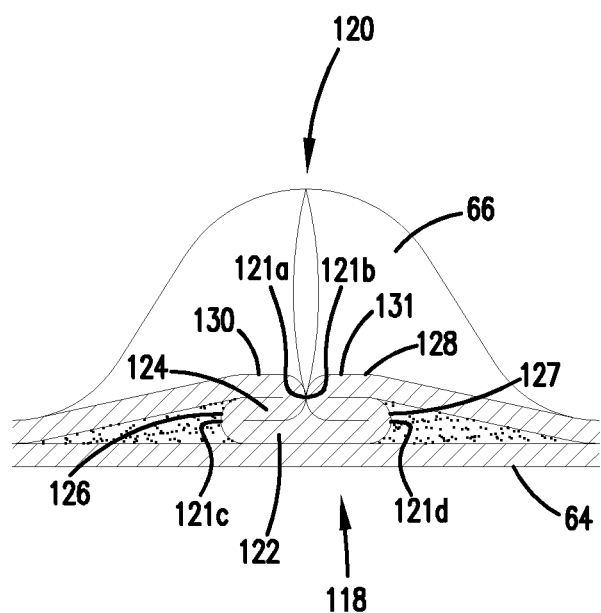
FIG. 5 is a schematic cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Other techniques for media management are described in PCT application US 04/07927, filed Mar. 17, 2004, incorporated herein by reference.

Techniques described herein are well adapted for use of media packs that result from arrangements that, instead of being formed by coiling, are formed from a plurality of strips of single facer.

Opposite flow ends or flow faces of the media pack can be provided with a variety of different definitions. In many arrangements, the ends are generally flat and perpendicular to one another.

The flute seals (single facer bead, winding bead or stacking bead) can be formed from a variety of materials. In various ones of the cited and incorporated references, hot melt or polyurethane seals are described as possible for various applications. These are useable for applications described herein.

Figure 6:
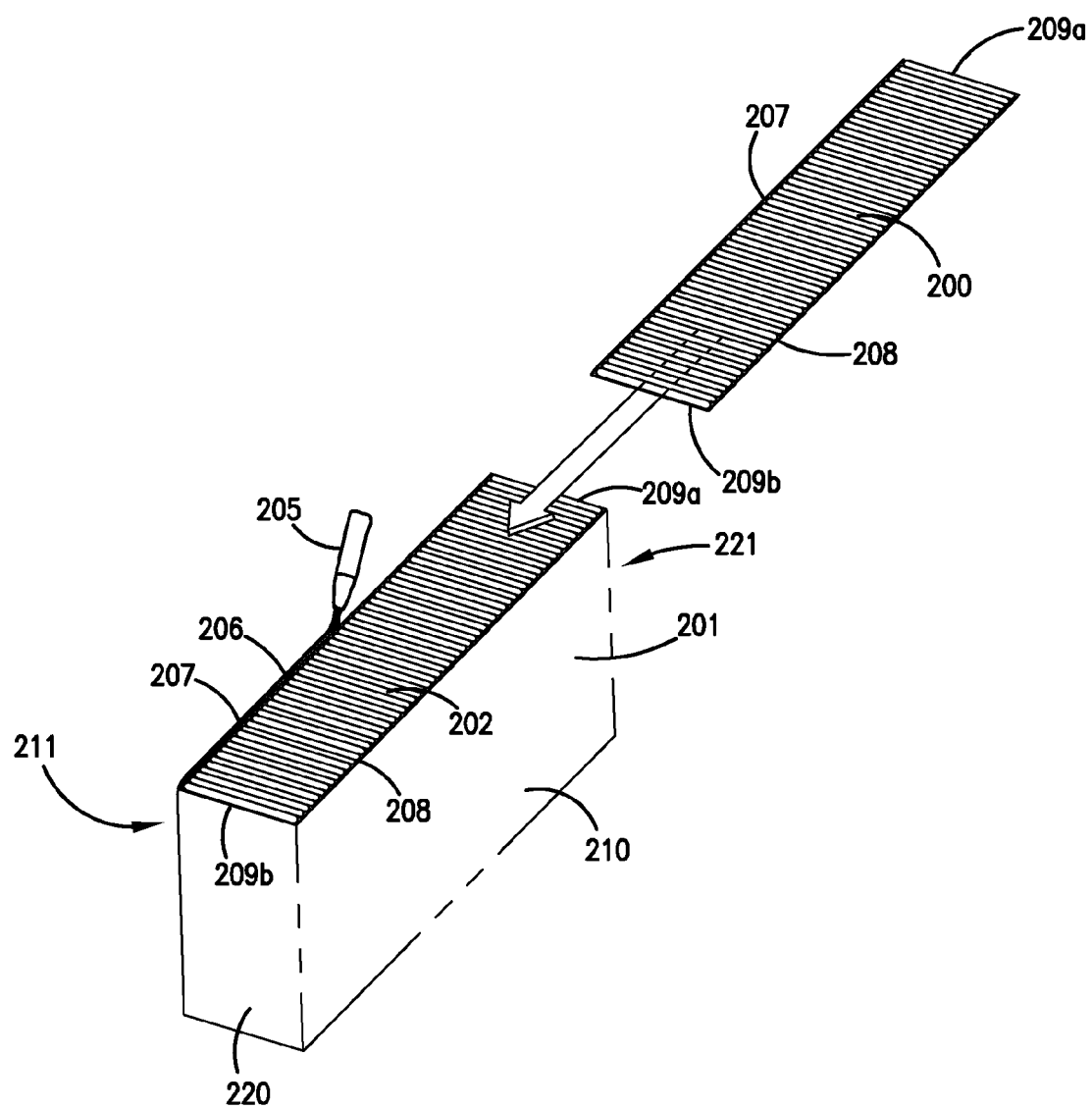
FIG. 6 is a schematic depiction of a step of creating a stacked z-filter media pack.

In FIG. 6, schematically there is shown a step of forming a stacked z-filter media pack from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 6, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 6, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 6, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with certain of the remaining figures. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces. Such a shape is discussed with respect to FIGS. 23 and 24.

In some instances, media pack 201 will be referenced as having a parallelogram shape in any cross-section, meaning that any two opposite side faces extend generally parallel to one another.

It is noted that a blocked, stacked arrangement corresponding to FIG. 6 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that a stacked arrangement shown in U.S. Ser. No. 10/731,504, is a slanted stacked arrangement.

Figure 7:
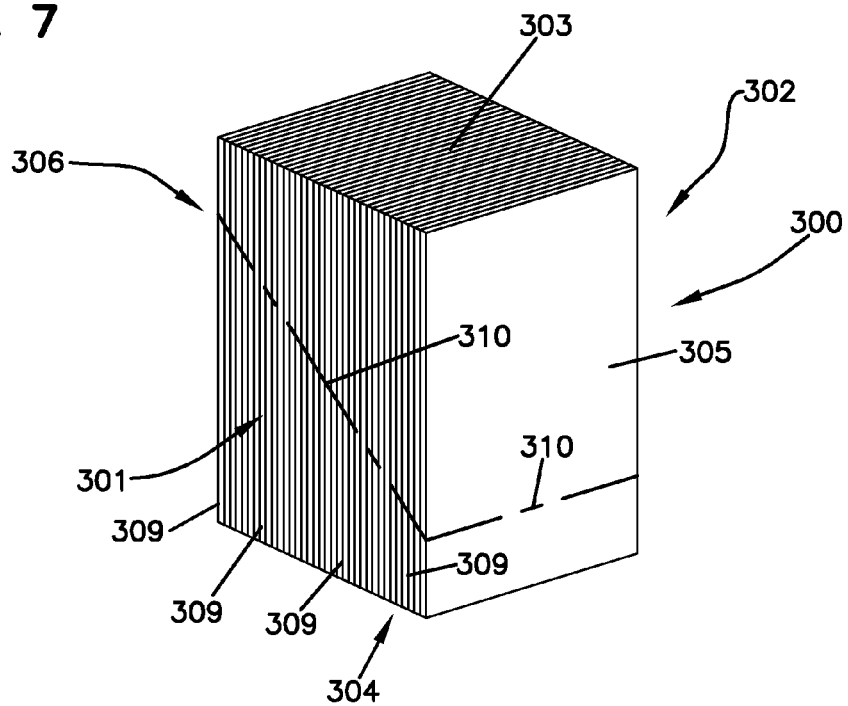
FIG. 7 is a schematic perspective view of a media stack with phantom lines indicating cut lines or a cut plane, for a step for preparing a media pack for inclusion in filter cartridge according to the present disclosure.
Figure 8:
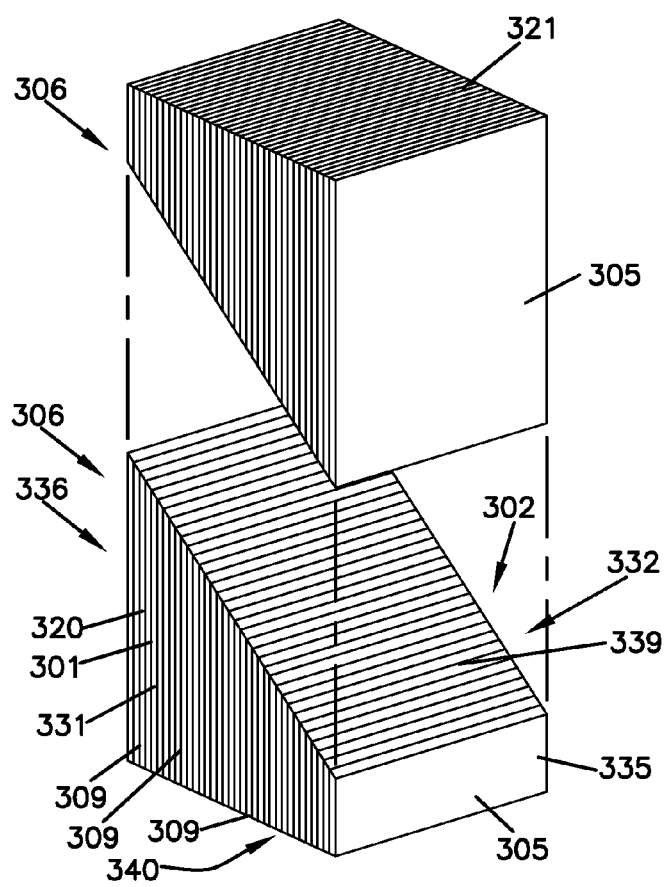
FIG. 8 is a schematic perspective view depicting media pack FIG. 7 separated, into two media packs, after a step of cutting.

III. Selected Media Packs; Filter Cartridges; and, General Cartridge Use in Air Cleaner Assemblies A. Media Pack Configuration Variations; FIGS. 7 and 8.

The present disclosure, in part, relates to generation of, and use of, media pack configurations involving the utilization of single facer strips of z-filter media (i.e. fluted, for example corrugated, sheets secured to facing sheets) in stacked form, and in configurations that do not have a blocked, or slanted, rectangular, parallelogram configuration. That is, an inlet flow face (and outlet flow face) for the stacked media pack generally does not have a rectangular perimeter definition. Each flow face also typically has a non-circular perimeter definition.

The principles can be applied in a wide variety of configurations. An example will be understood by reference to FIGS. 7 and 8.

Referring to FIG. 7, a perspective view is depicted of a media stack 300, for example made in accord with the principles described above. Media stack 300 includes: first and second opposite flow faces, 301, 302; a first pair of opposite sides, 303, 304; and, a second pair of opposite sides, 305, 306. Sides 303, 304, represent side ends of strips of single facing material, each strip comprising a fluted sheet secured to a facing sheet. Single facer strips are schematically represented in FIG. 7, examples indicated at 309.

Faces 301, 302, are, generally, flow faces. In a typical z-filter media stack such as stack 300, as discussed previously, fluted media sheets contained within media stack 300, generally include flutes which extend in a direction between the flow faces 301, 302. At least a portion of one of the flow faces 301, 302 will operate as a inlet flow face, in a filter cartridge utilizing some or all of media stack 300; and, at least a portion of an opposite one of the flow faces 301, 302, will operate as an outlet flow face, in such a filter cartridge.

Herein when it is said that the flutes of the fluted sheet "extend in a direction" between the flow faces 301, 302, it is not meant that the flutes necessarily extend entirely one flow face 301 to the other flow face 302. Rather the general direction of extension is meant. The flutes may be truncated at or adjacent one or more of the sides 301, 302, for example by flute modification such as darts or other end pressing to the media flutes.

At 310 phantom lines are shown, where a modification in the media stack 300 will be made by a cut, in order to generate at least one media pack. For the particular example shown, the phantom line 310 indicates a cut line which will form two media packs, as discussed below, each of which is incorporated into filter cartridge in accord with the present disclosure. Generation of two filter cartridges at once is a matter of positioning the cut line 310 to create two symmetrical halves when cut.

In FIG. 8, stack 300 is shown having been cut along line 310, FIG. 7, to generate two media packs 320, 321 of similar or identical outer perimeter shapes, when viewed in plan view (toward one of the flow faces for each of media packs 320, 321). The term "perimeter shaped" when used in this context, to refer to the media packs 320, 321, is meant to refer to general peripheral perimeter definition, not to specific surface features (such as flutes or corrugations) of the media.

It is noted that alternate cuts can be made to the one shown at 310, FIG. 7, to generate only one media pack for utilization in a single cartridge, or to generate two or more of different shapes, for different uses. Further, the cut 310 does not need to be straight, although such would typically be convenient for assembly. Typically the plane of cut line 310 is both straight and generally perpendicular to the flow faces 301, 302.

From the process as previously described, it will be understood that one of the side surfaces 305, 306 will be represented by a fluted (for example, corrugated) sheet; and, an opposite one of surfaces 305, 306 will comprise a facing (for example non-fluted or corrugated) sheet. From this it will be understood that the media packs 320, 321, will not be precisely identical beyond general shape, since the sides 305, 306 through which the line of cut 315 occurred, FIG. 7, have different detail, i.e. one is an exposed flute sheet and one is an exposed facing sheet, in the example process described.

It is noted that media packs according to the present disclosure, one or more the media surfaces or sides 305, 306 can be covered, for example with a protective covering sheet, either before, or after, cutting.

In more general terms, in one aspect of application of the principles described herein, a media pack configuration is provided which comprises a stack of single facers strips, each single facer strip comprising a fluted sheet secured to facing sheet, the individual single facer strips being secured together in a media pack. The media pack has first and second opposite flow faces with flutes of the fluted sheet(s) extending generally in a direction between the flow faces. The flow faces are generally defined by a non-rectangular perimeter definition. An example would be perimeter definition comprising generally straight sides, typically four straight sides. Example would be trapezoidal, although alternatives are possible.

For a particular media pack 320, FIG. 8, the media pack first and second opposite flow faces include flow face 331, which is viewable, and opposite face flow face 332; and, a first pair of opposite sides 339, 340; and, second pair of opposite sides 335, 336.

The first pair of opposite sides 339, 340, comprise side edges of the flute strips 301, with the flute strips extending therebetween. The second pair of opposite sides 335, 336, are formed by one comprising, in a typical media pack 320, an exposed a facing sheet, and the other an exposed fluted sheet.

For the particular example shown, a general perimeter shape is provided for the media pack 320, in which, when flow a face (331, 332) is viewed in plan view one pair of sides 339, 340, comprises sides generally planar and non-parallel to one another; with one being longer (at intersection with the flow faces 331,332) than the other; and, a second pair of sides edges (335, 336) is present which a extend generally parallel to one another, and which form generally parallel intersections with faces 331, 332 that are not generally the same length. When lengths are compared, linear distance between ends are compared, and flutes or corrugations are disregarded.

The particular overall shape media pack 320, FIG. 8, can be described a trapezoidal block with flow faces 331, 332 each having a trapezoidal perimeter; although alternate shaped arrangements are possible utilizing the principles described herein. For the particular block shape media pack 320, FIG. 8, each of the sides 335, 336, 339, 340 extends generally perpendicularly to planes of the flow faces 331, 332. This will be convenient and typical, although alternatives are possible.

Herein when it is said that a side is planar, corrugations or flutes and media are disregarded. Further, when it is said that edge is "straight" flutes or corrugations of media are disregarded.

It is noted that stack of strips analogous to that shown in FIG. 8 can be made from a stack of strips analogous to that shown in FIG. 8 can be made a stack of strips, on the slanted side resulting from strips progressive shorter than adjacent strips. When such is the case, the side has a somewhat stepped configuration, as opposed to smooth straight configuration. However, when embedded in a side panel of the type discussed below the net result will be the appearance of a straight side.

B. Air Filter Cartridge Incorporating Media Pack 320, FIG. 8; See FIGS. 9-13.

Figure 9:
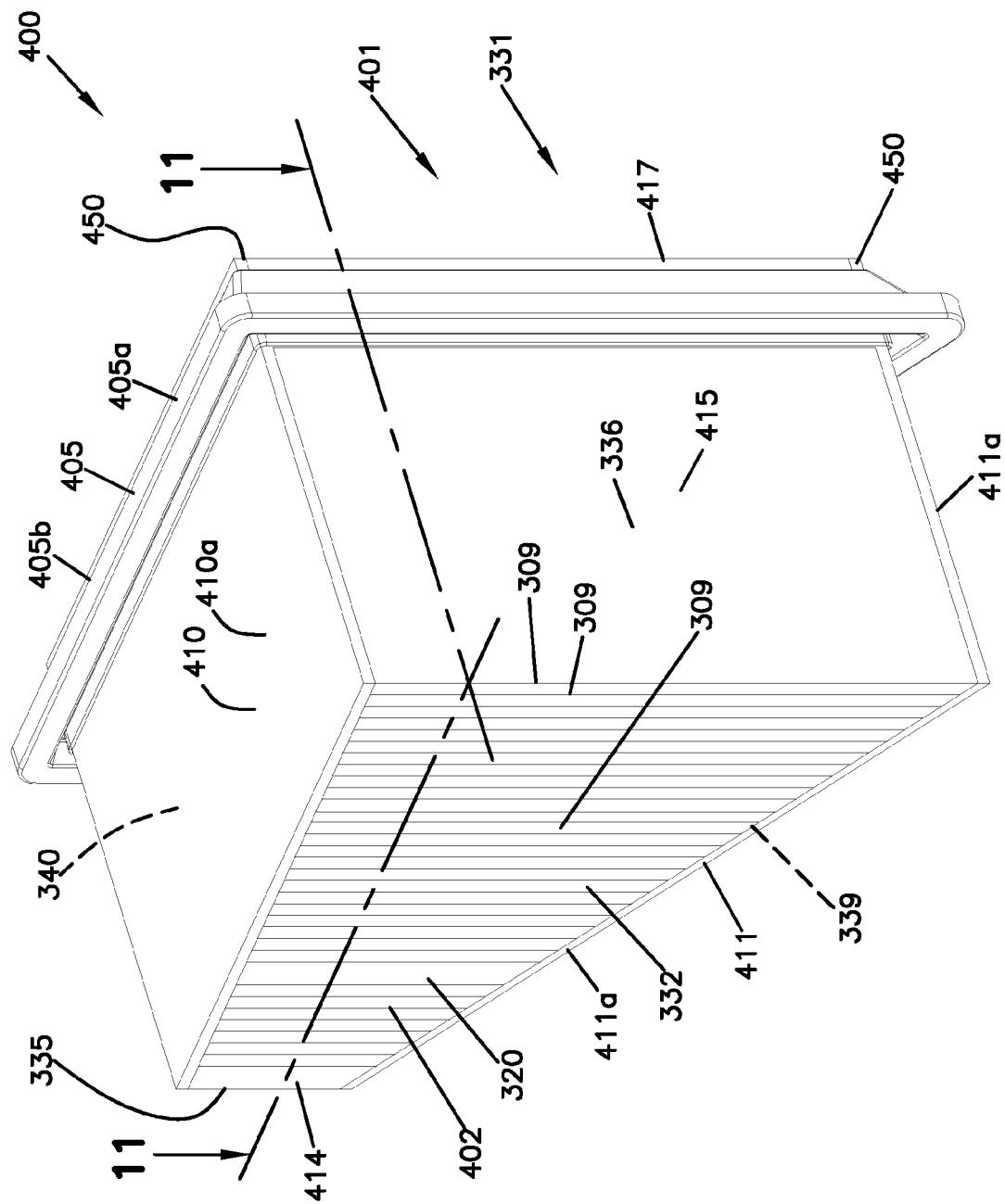
FIG. 9 is a schematic outlet flow face perspective view of filter cartridge incorporating a media pack in accord with the process schematically depicted in FIGS. 7 and 8.

Reference numeral 400, FIG. 9 references a filter cartridge incorporating a media pack 320 in accord with FIG. 8. In FIG. 9, the filter cartridge is viewed in a direction oriented toward a media pack face 332, which forms an outlet flow face 402 in the cartridge 400.

Media pack face 331 generally defines a inlet flow face 401 of the cartridge 400. When in use, air flow during filtering, proceeds through air filter cartridge 400 from inlet flow face 401, to outlet flow face 402. Still referring to FIG. 9, at 405 housing seal arrangement is provided, in cartridge 400. The housing seal arrangement 405 provides, generally, for sealing to an air cleaner housing in use. The particular housing seal arrangement 405 depicted comprises a peripheral seal arrangement 405a, with a seal flange 405b, that extends, peripherally, around the remainder of cartridge 400.

Referring again to FIG. 9, filter cartridge 400 can be characterized as including first pair of opposite sides 410, 411; and, second pair of opposite sides 414, 415. The first pair of opposite sides 410, 411 generally corresponds to sides 340, 339 of media pack 320, covered at least in part by a side panel, 410a, 411a respectively. Sides 414, 415 will typically be such that one comprises an exposed facing sheet and the other an exposed fluted sheet, although alternatives are possible. However, as explained above, an optional covering can be positioned over one or both of sides 414, 415.

Still referring to FIG. 9, side 340 of media pack 320 comprises a side piece 410a, typically comprising a molded-in-place side piece for sealing ends of strips 309, to form side 410 of cartridge 400. The media pack side 339 is covered by side piece 411a typically comprising a molded-in-place side piece forming side 411 of cartridge 400, opposite side 410, and sealing ends of sides (i.e. as side edges) of the single facer strips 309.

Still referring to FIG. 9, media pack sides 335, 336 provide sides 414 and 415 respectively of cartridge 400.

In FIG. 9 it is noted that housing seal arrangement 405 is recessed from end 402 from end 401 slightly, as shown at 417.

For a typically arrangement, at least 50%, usually at 60% often at least 70% of a length of the media pack 320 between flow faces 401, 402 is positioned on a downstream side of housing seal arrangement 405 i.e. between housing seal arrangement 405 and outlet flow face 402.

Figure 10:
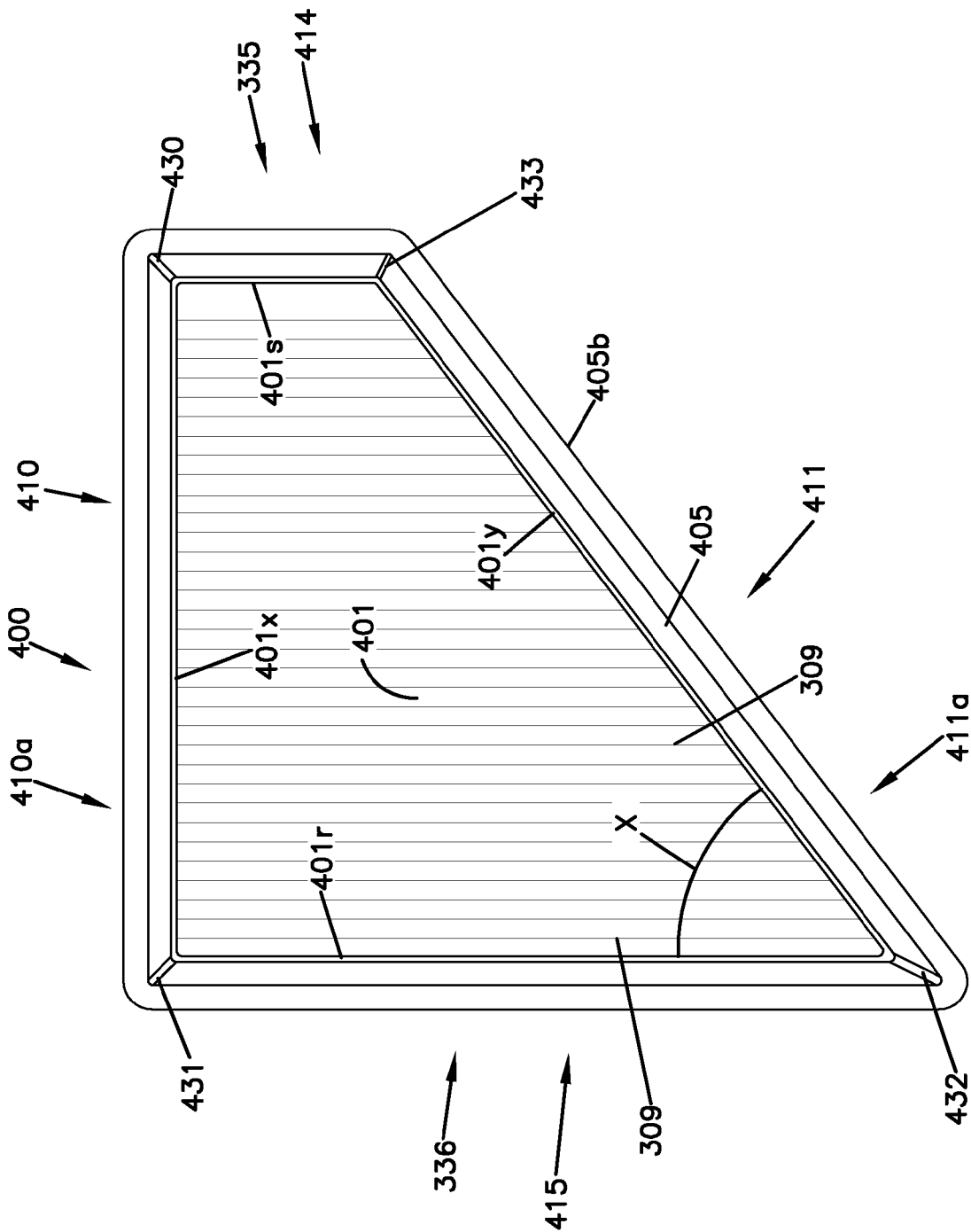
FIG. 10 is a schematic inlet face plan view of the filter cartridge depicted in FIG. 9.

In FIG. 10, cartridge 400 is shown in plan view, the view being directed toward inlet face 401. Again, face 401 is the face into which air will be filtered as directed, during operation of an air cleaner including cartridge 400 therein.

Referring to FIG. 10, it is noted that the inlet flow face 401 has a non-rectangular perimeter (for the example shown a trapezoidal shape perimeter with: opposite parallel (disregard filters or corrugations) side edges 401r, 401s, of different lengths; and, opposite side edges 401x, 401y of different lengths, non-parallel to one another. When the lengths of edges are compared, in this manner, flutes or corrugations are disregarded. For the particular example shown, edge 401x extends generally perpendicularly to edges 401r, 401s. Edge 401y forms an angle X with edge 401r of less than 90°, typically not greater than 80° usually not greater than 70°, often at least 40° and typically within the range of 45°-65°.

Referring again to FIG. 9, it is noted that in some examples a region 450 of media pack 320 may not be covered by side pieces 410a, 411a. For example, panels 410a, 411a may be recessed from surface 401 a distance of at least 5 mm, typically 5 mm-10 mm.

Thus, in general terms, it is said that the side pieces 410a, 411a cover at least a portion of the corresponding media pack sides 410, 411. Typically they cover at least the entire media pack side in extension from the housing seal arrangement 405 to the outlet end 402. In some instance they may be recessed from the flow face 401 a small amount. In others, they may cover the entire sides 410, 411.

Figure 11:
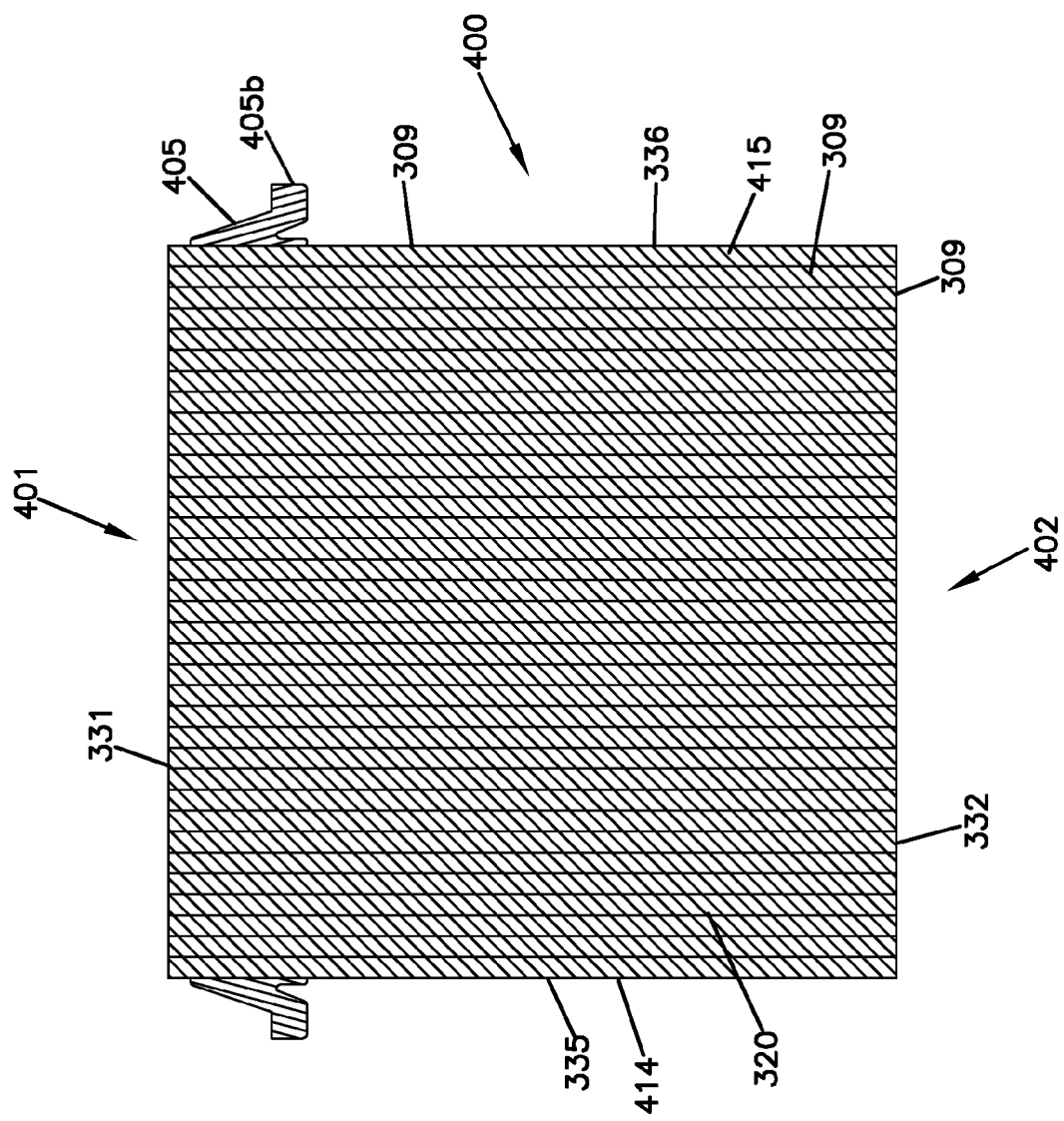
FIG. 11 is a schematic, cross-section view taken along line 11-11, FIG. 10.

FIG. 11 a schematic cross-sectional view taken along a plane of lines 11-11, FIG. 9 is viewable.

Referring again to FIG. 9, the housing seal arrangement 405 generally comprises a molded-in-place construction, meaning that after panels 410a, 411a are positioned on media pack 320, sealing arrangement 405 is molded to the resulting construction, peripherally therearound.

Figure 12:
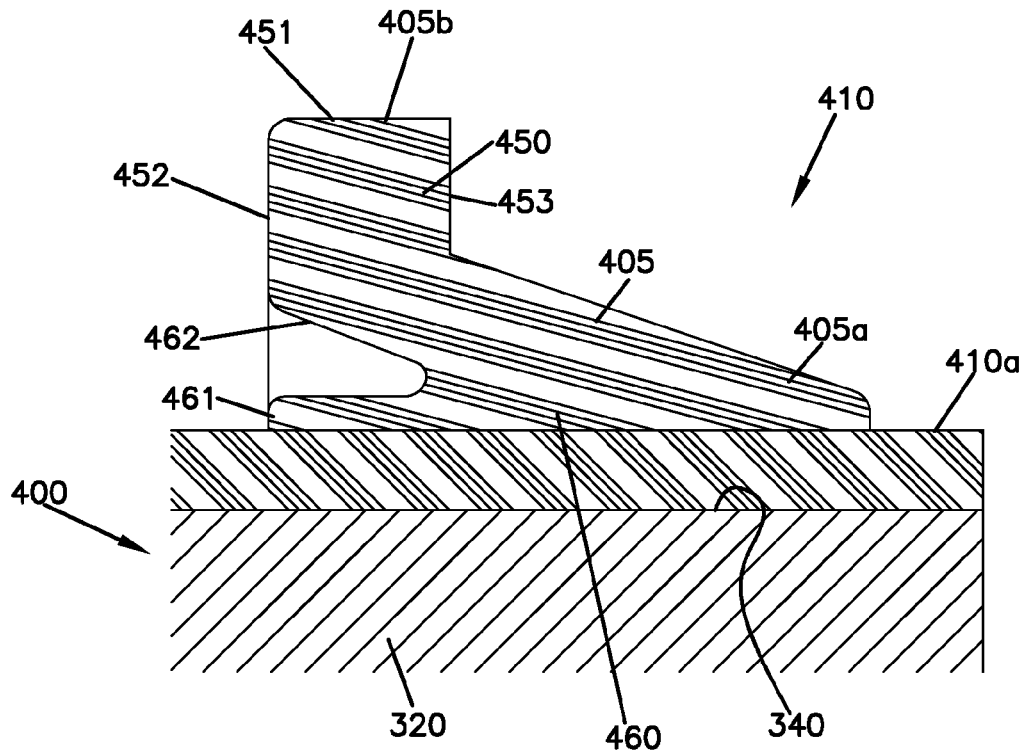
FIG. 12 is a schematic, enlarged, fragmentary cross-sectional view of a portion of the filter cartridge depicted in FIG. 11.

Attention is now directed to FIG. 12, an enlarged, fragmentary, cross-sectional view depicting a portion of the filter cartridge 400. In FIG. 12 the cross-sectional view is taken through the housing seal arrangement 405 at a location where housing seal arrangement 405 crosses side 410 (and side panel 410a) of cartridge 400.

In general, the housing seal arrangement has a constant cross-section around media pack 320 (i.e. around cartridge 400), except in corners where some modification may result; the corners being generally indicated in FIG. 10 at 430, 431, 432, and 433. Of course variations from a consistent cross-section are possible, but a consistent cross-section is convenient for manufacture. Again the housing seal arrangement 405 will typically be molded-in-place, and techniques for this are referenced generally below.

The housing seal arrangement 405 includes a compression portion 450 forming flange 405b, which has an outer annular surface 451 extending between opposite ends 452, 453. End 453 is sized and positioned to be engaged by a pressure flange on a housing access cover, and end 452 is sized and positioned to be directed toward a portion of a housing base section, with a rib pressing into the seal member 450. This will be described further in connection with FIG. 13 below.

Still referring to FIG. 12, the housing seal arrangement 405 includes a base section 460, by which the housing seal arrangement 405 is secured to the remaining portion of the cartridge 400. Base 460 includes a projection 461 oriented to a recess, gap or space 462 between the projection 461 and a portion of compression portion 450. Utilization of the gap 462 will be understood from discussion below, in connection with FIG. 13.

Figure 13:
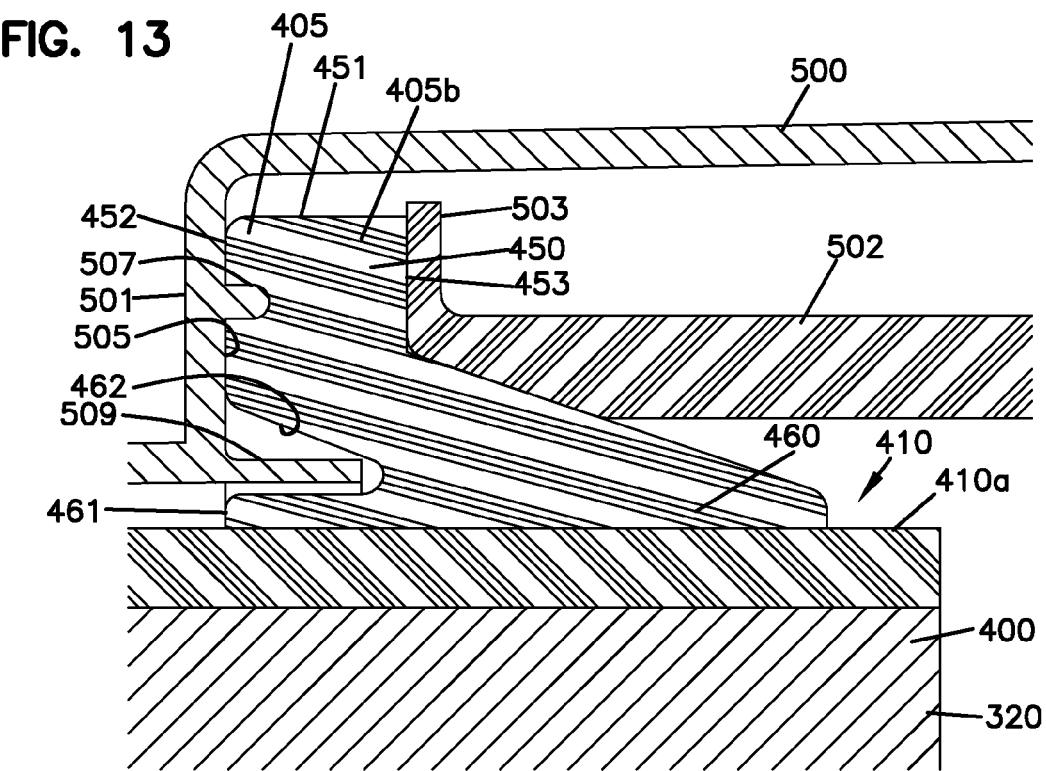
FIG. 13 is a schematic, fragmentary, cross-sectional view of the portion of the filter cartridge depicted in FIG. 12, depicted positioned between two housing sections.

In FIG. 13, a schematic fragmentary large cross-sectional view depicting the portion of cartridge 400 viewed in FIG. 12, positioned within portions of an air cleaner housing 500, is provided. Referring to FIG. 13, flange 405b of housing seal arrangement 405 is shown compressed between a portion of housing base section 501 and a portion of housing access cover 502. In particular, seal pressure flange portion 503 on housing access cover 502 is directed against surface 453; and, pressure flange portion 505 of housing base section 501 is pressed against the surface 452. Bead projection 507 (typically a continuous bead in extension around cartridge 400) is provided on pressure flange 501, for projection into compression portion 450 to facilitate sealing. It is also noted that the housing base portion 501 includes a flange 509 that projects into recess or gap 462, at a location between projection 461 and a portion of compression portion 450 of housing seal arrangement 405.

Clamping forces directing access cover 502 toward housing base 501 can be used to provide a pinch of housing seal flange portion 405b, to ensure non-filtered air does not bypass media pack 320 during utilization of air cleaner assembly 500. Example features of the air cleaner assembly are understood by reference to FIGS. 14-16.

C. Air Cleaner Assembly, FIGS. 14-16.

Figure 14:
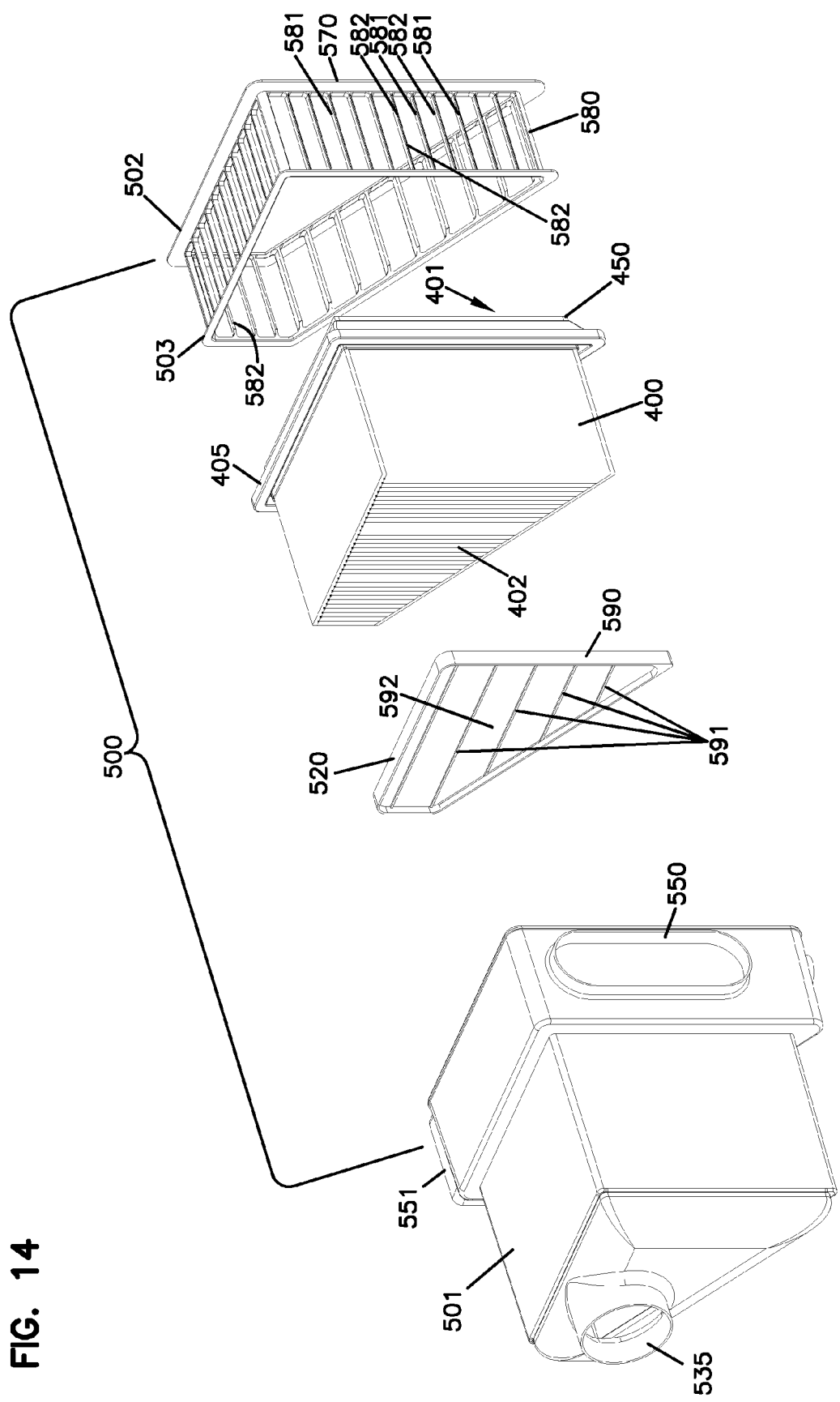
FIG. 14 is a schematic, exploded, outlet end perspective view of an air cleaner assembly including a filter cartridge according to FIGS. 9-12, therein.
Figure 15:
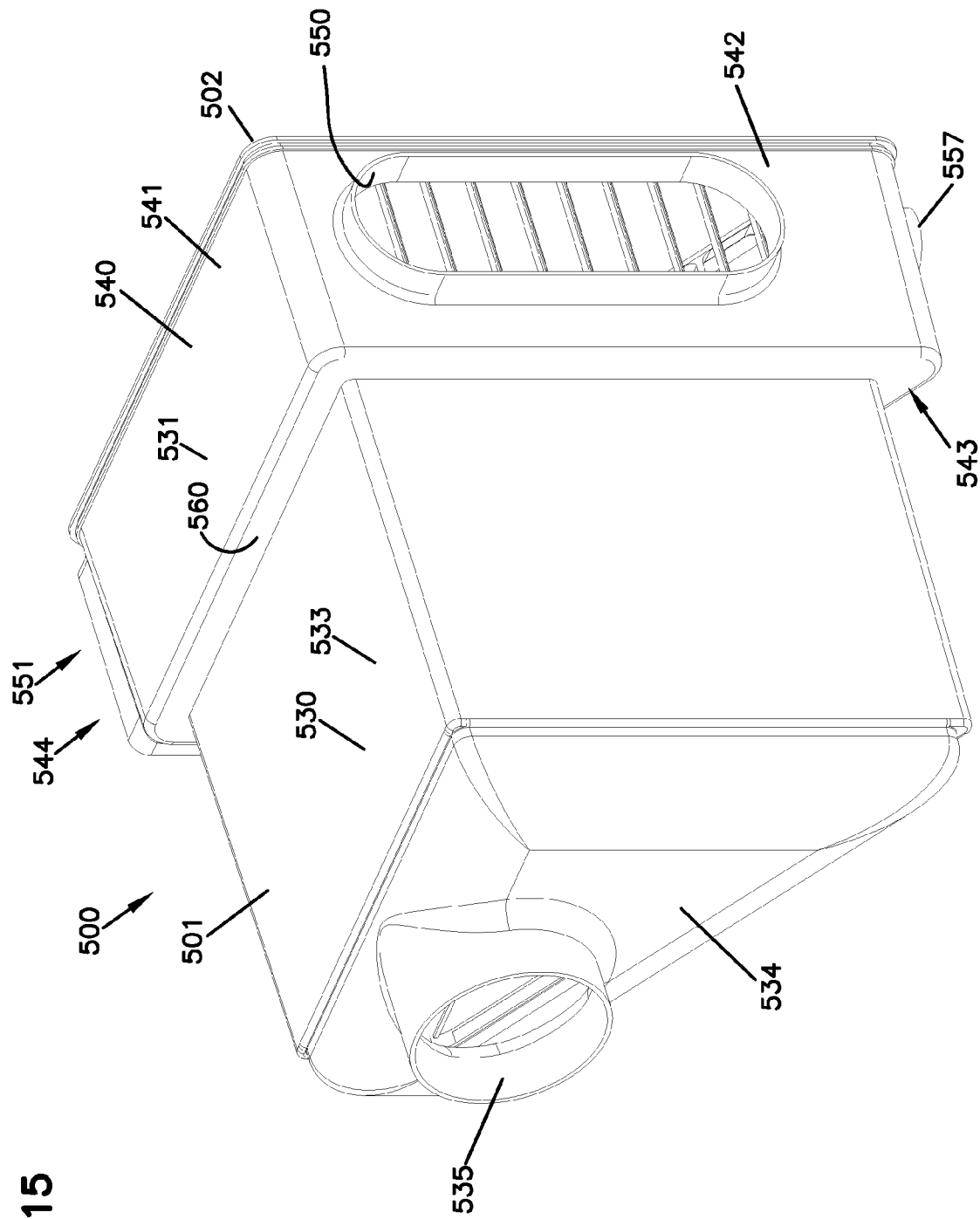
FIG. 15 is an outlet end perspective view of an air cleaner assembly of FIG. 14, in a non-exploded view.
Figure 16:
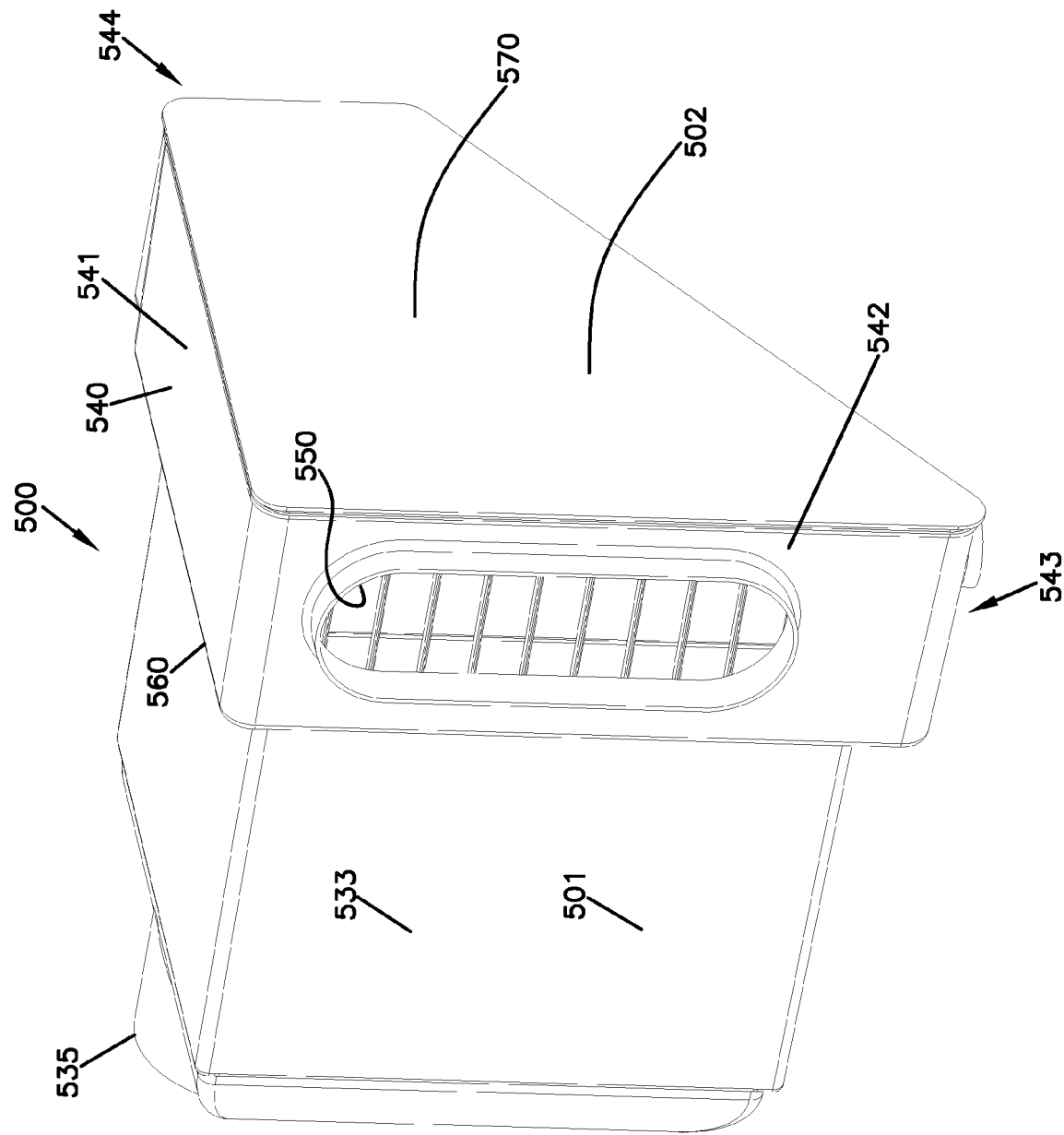
FIG. 16 is an inlet end perspective view of the air cleaner of FIG. 15.

In FIGS. 14-16 an air cleaner assembly or air cleaner, including a cartridge 400 generally in accord with FIGS. 9-11 is shown. Referring to FIG. 14, the air cleaner 500 is depicted in exploded view. Housing base 501 and access cover 502 are viewable, as well as cartridge 400. Cartridge 400 is positioned within an interior of housing base 501, and access cover 502 is put in place, typically being secured by the latch arrangements, or other securing arrangements, not shown. The access cover 502 includes pressure flange 503 which will be pressed against a housing seal arrangement 405, as discussed above in connection with FIG. 13, compressing housing seal arrangement 405 against a pressure surface within an interior of housing base 501, to ensure sealing.

It is noted that for the air cleaner 500 depicted in FIG. 14, latches or other securing arrangement for the access cover 502 are not depicted, for convenience. A variety of conventional over center latches or similar constructions can be used.

Still referring to FIG. 14, at 520 a frame piece is shown, which is inserted with an interior of housing base 501, for cartridge 400. The frame piece 520 includes an outer perimeter 590 and cross pieces 591. The cross pieces at 591 can be positioned and used to support downstream surface 402 of cartridge 400, during installation. In some instances, media 592 can be provided in the frame piece 520, so that the frame 520 can be used as a safety filter.

In FIG. 15, air cleaner 500 is shown assembled. Referring to FIG. 15, housing base 501 includes an outlet section 530 an inlet section 531. The example shown, the outlet section 530 and the inlet section 531 are integral sections of a single molded piece. Outlet section 530 includes a side wall 533 which surrounds the installed cartridge 400 (FIG. 14) during use. Housing base 501 further includes rear wall 534, having an air flow outlet 535 therein. Outlet 535 can be shaped in a variety of shapes and be positioned at a variety of locations. Typically, end wall 534 will be configured to funnel air to outlet 535, in a convenient manner. From outlet 535, filtered air from the air cleaner 500 is directed to components for equipment assembly which the air cleaner 500 installed for use. Typically the equipment will comprise a the vehicle or other equipment being internal combustion engine, and filtered air from outlet 535 is directed, in due course, into the engine for use as combustion air.

Still referring to FIG. 15, housing inlet section 531 includes a side wall 540 extending there around. The side wall 540 includes side panels 541, 542, 543, 544. In side panel 542 an inlet aperture 550 is positioned as an inlet arrangement. In opposite side wall 544 analogous, but smaller, inlet 551 is provided. It is noted that inlet can be provided in one or more of the side walls 541, 542, 543, 544 as an example. Preferred positioning and the size of the inlet, will be a matter of choice, for the equipment assembly involved, in which the air cleaner 550 is to be installed in use. Typically, duct work is used to direct unfiltered air to air cleaner 550 through one or more of the inlets 550, 551. If one of the inlets 550, 551 is not used, it can be closed to cover; or the air cleaner 500 can be assembled with only those inlet apertures intended to be used, therein.

Typically, air flow inlets 551, 550, will be positioned in sidewalls of the section 531 that are not directed upwardly downwardly, in use, although alternatives are possible.

Referring to FIG. 15 at 557 a lower drain aperture is positioned, for draining any water that is directed into the inlet arrangement 550, 551 during use.

Still referring to FIG. 15, it is noted that inlet section 531 defines a access opening in base 501 at an end opposite from end wall 534. The access opening which is covered by access cover 502 during use.

Still referring to FIG. 15, at 560 a transition step between sections 530, 531 is provided, in housing base 501. An interior portion of step or region 560 defines a pressure flange 505; bead 507 and flange 507, FIG. 13.

In FIG. 16, an inlet end perspective view of air cleaner 500 is depicted. In FIG. 16, closed end panel 570 in access cover 502 is viewable. The panel 570 closes the access opening defined by inlet section 531.

Referring again to FIG. 14, between front panel 570 and pressure flange 503, access cover 502 includes a sidewall portion 580. In example depicted in FIG. 14, sidewall portion 540 comprises a series of struts or braces 581 positioned to direct a compression force from panel 570 to pressure flange 503 in use. The struts or braces 581 are spaced to define air flow openings 582 in sidewall portion 580 to facilitate air flow entering one or more of the inlet apertures 550, 551.

In general terms, an outer perimeter of panel 570 is larger than a perimeter of sidewall 580. Sidewall 580 and pressure flange 503 are received within upstream section 541 of housing 501, in use. This means that the sidewall 580 will extend across inlet flow apertures, such as flow apertures 550, 551. Air flow apertures 582 in sidewall 580, formed by struts 581, permit the air flow to pass generally through inlets 550, 551 and also through sidewall 580, to reach upstream face 401 of the cartridge 400, during use.

Referring FIGS. 9-14 it is noted that the cartridge 400 does not include a specific handle thereon for grasping during installation. In some instances, it may be desirable to utilize a handle, which can be attached to the cartridge 400 in a variety of ways.

The housing base 501 will be understood to have a cross-sectional shape which is trapezoidal when taken across the direction between the access opening and end wall 534.

It is noted that during when the term "trapezoid" and variant thereof, is used to refer to portions to the cartridge 400 or air cleaner 500, is meant that any curved corners should be disregarded, and only the general shape of the sides defining the perimeter is referenced.

When installed, typically at least 60% (usually at least 70%) of a length cartridge 400 between flow faces 401, 402 is received within outlet section 530 of housing base 501.

D. Equipment Assembly Including Air Cleaner 500; FIGS. 17-21.

Figure 17:
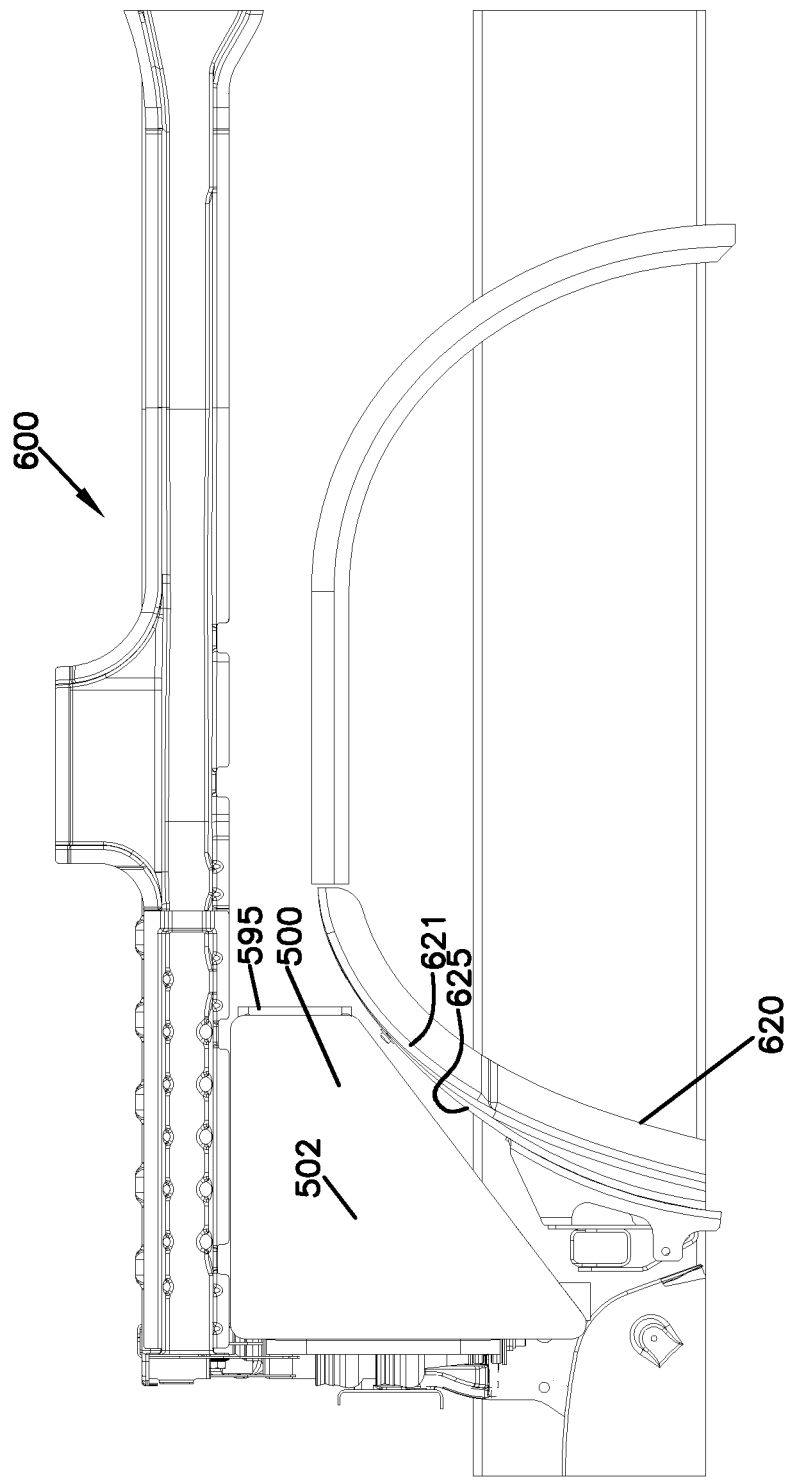
FIG. 17 is a fragmentary, schematic, view of an equipment system of an equipment system including an air cleaner assembly according to FIGS. 14-16 installed therein; the view of FIG. 17 being toward an access or service cover of the air cleaner.

Reference numeral 600 of FIG. 17, depicts an example equipment system in which air cleaner 500 is installed, for use. In FIG. 17-21, the equipment system is depicted in fragmentary, schematic, views.

Referring first to FIG. 17, the equipment system 600, for example, can comprise a vehicle having a wheel well 620. It can be seen that due to the trapezoidal shape for outer perimeter 595, the air cleaner 500 (which accommodates a trapezoidal shape of an interiorly received cartridge 400) air cleaner assembly 500 is conveniently sized to be positioned into space 625, adjacent curved portion 621 of wheel well 625. In FIG. 17, the assembly 600 is viewed in an orientation such that access cover 502 is viewable.

Figure 18:
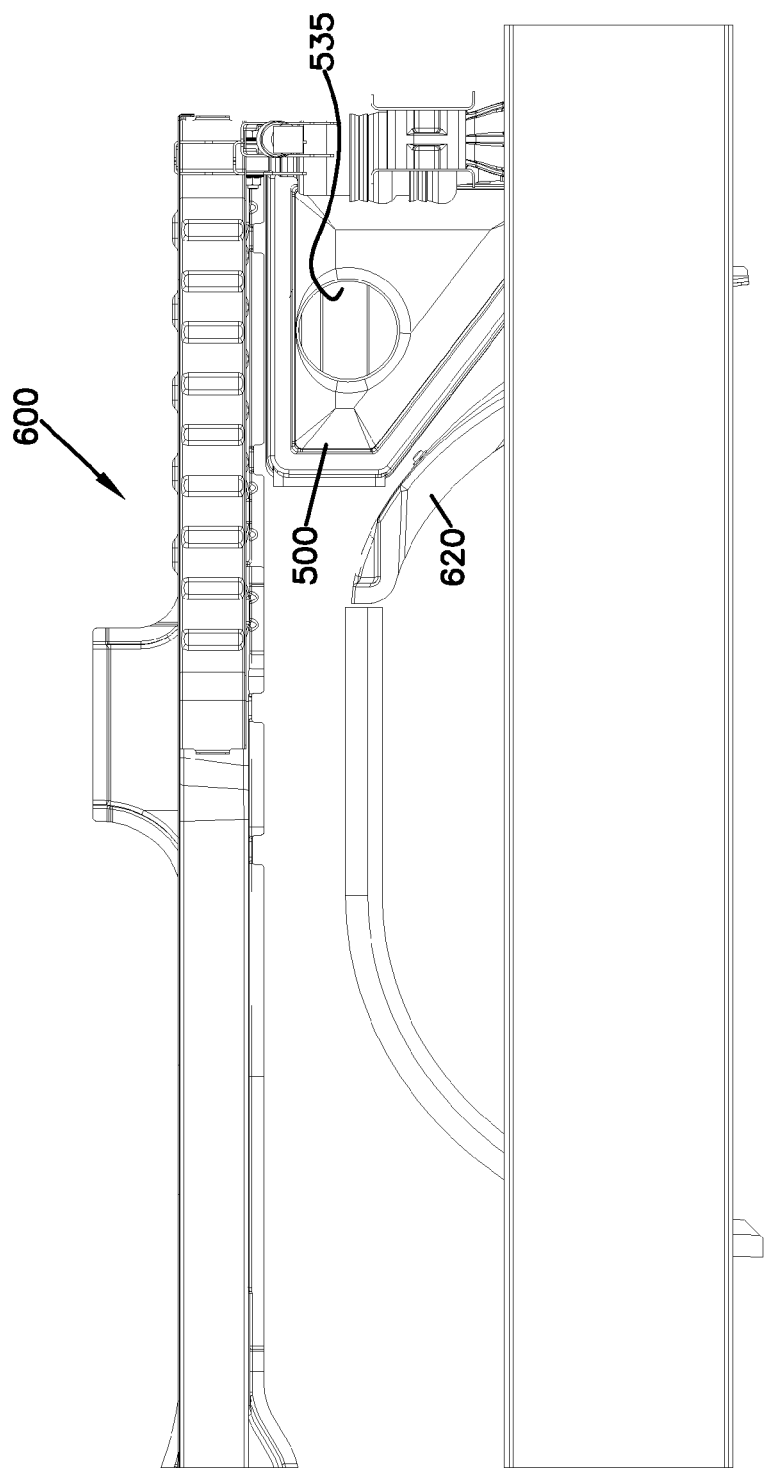
FIG. 18 is a fragmentary schematic view of the equipment assembly of FIG. 17; the view of FIG. 18 being directed toward an outlet end of the air cleaner.

In FIG. 18 a view analogous, but opposite to, that of FIG. 17 is viewable. Thus, the portion of air cleaner 500 viewed includes outlet 535.

Figure 19:
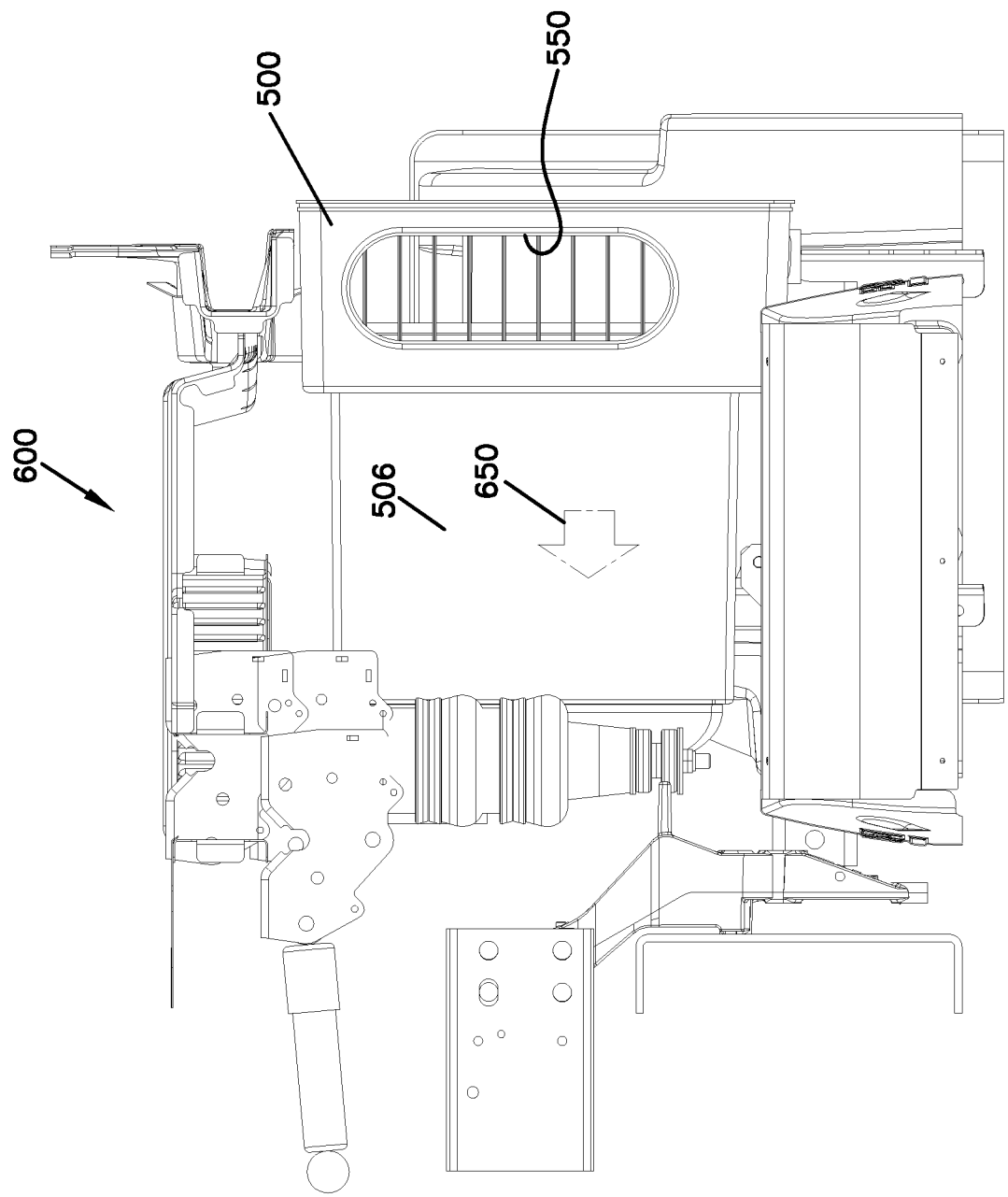
FIG. 19 is a side elevational view of the equipment system depicted in FIGS. 17 and 18.

In FIG. 19, side elevational view of equipment 600 including air cleaner 500 positioned therein is provided. The view is toward inlet 550. In FIG. 19, arrow 650 indicates a general direction of air flow, during filtering.

Figure 20:
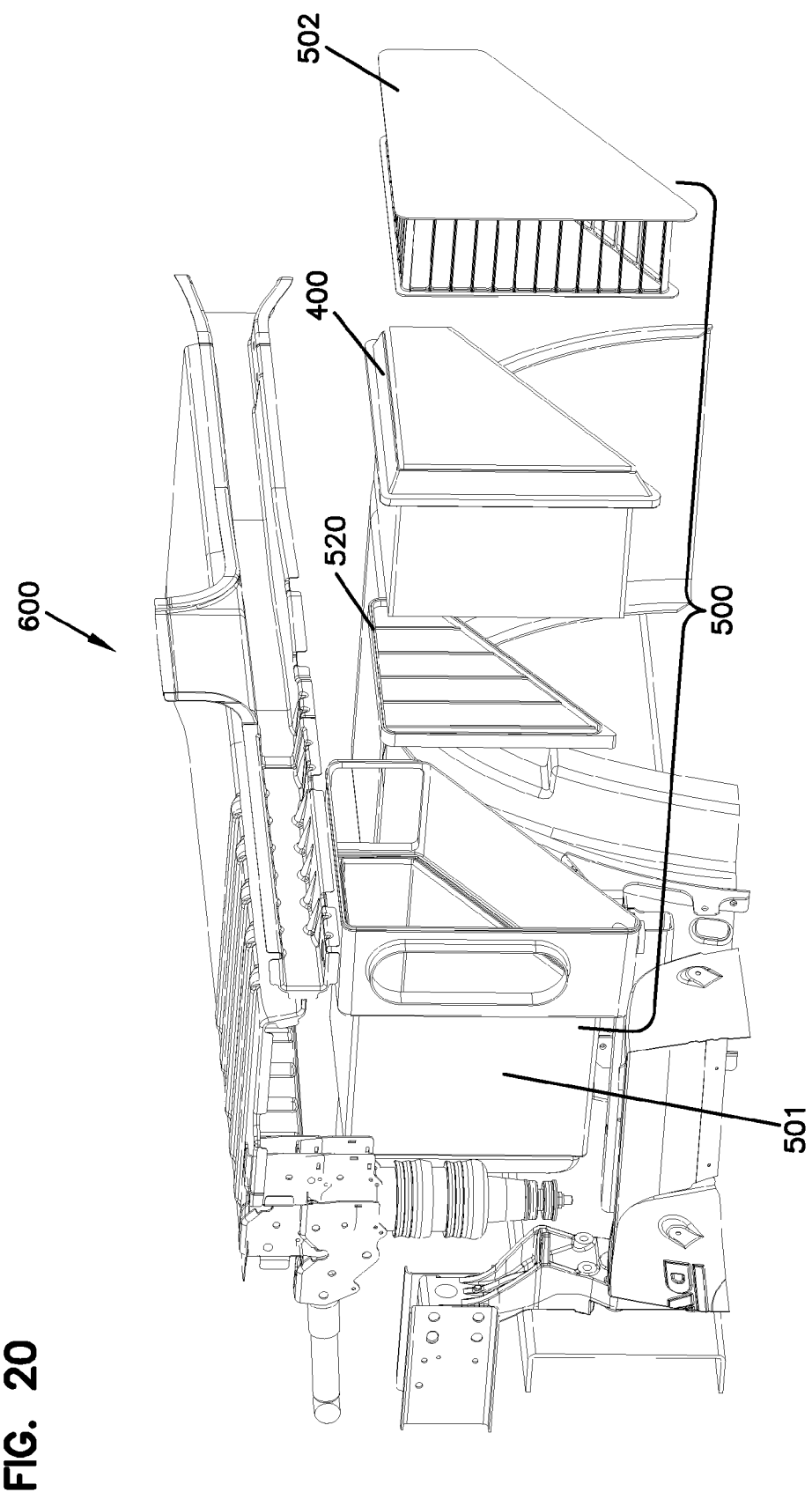
FIG. 20 is a schematic, exploded perspective view of the assembly depicted in FIGS. 17-20; the view of FIG. 20 being generally toward the access cover and inlet end.

In FIG. 20, a perspective view of assembly 600 is depicted, in which air cleaner 500 is viewed in exploded view. From this view, it is understood how installation of air filter cartridge 500, and cartridge 520, into air cleaner 500, can be conducted. Thus, general servicing steps can be understood.

Figure 21:
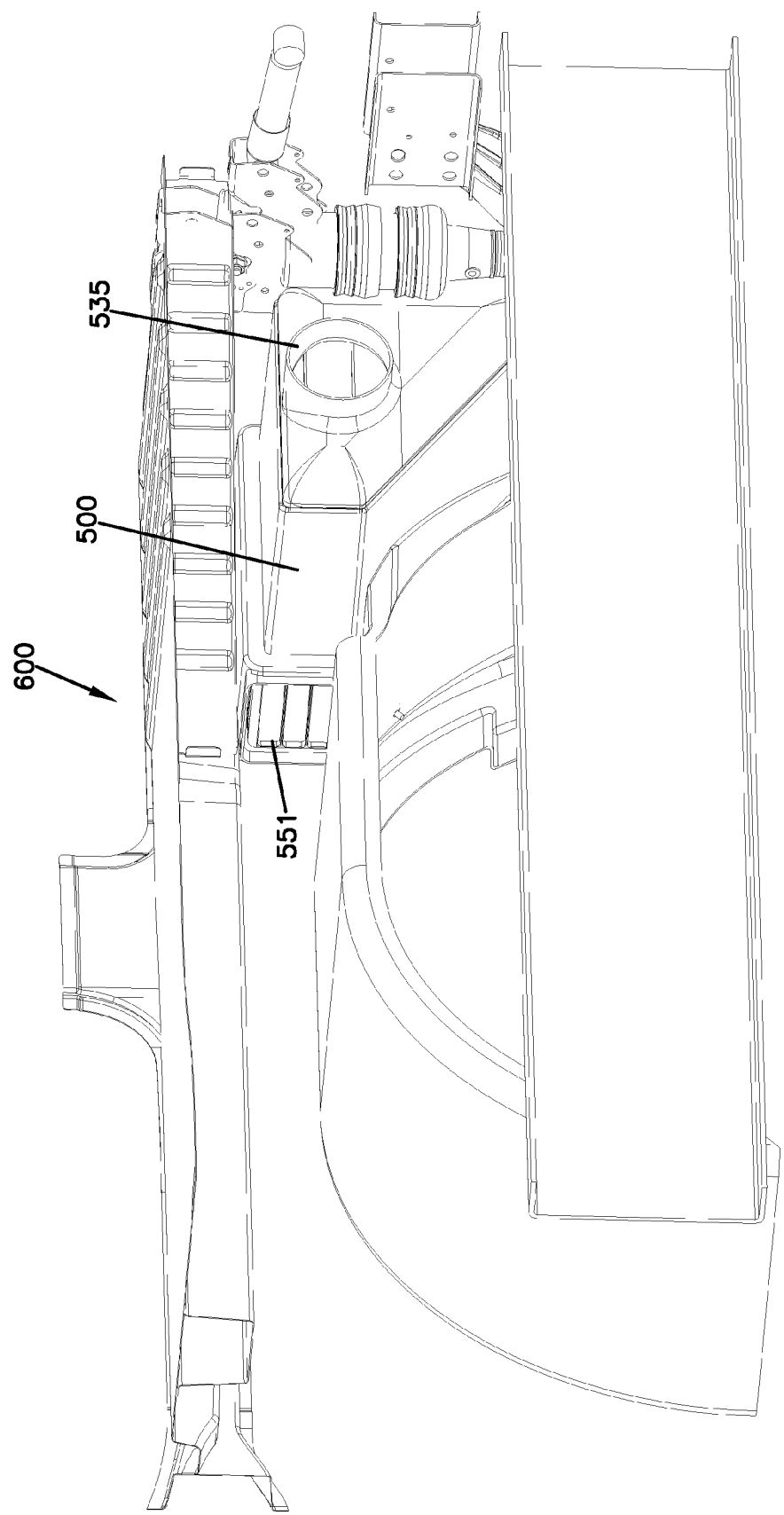
FIG. 21 is a schematic fragmentary outlet end perspective view of the equipment assembly depicted in FIGS. 17-20.

In FIG. 21, a perspective view is depicted, allowing for a viewing of outlet 535, (and inlet 551) and air cleaner 500.

E. Some Selected Materials; and Assembly.

A variety of materials can be utilized in air cleaner arrangement according to the present disclosure. Typically the air cleaner housing base 501 and access cover 502 will comprise molded plastic parts. The media pack will comprise an appropriate media for the intended application.

The side panels 410a, 411a, when molded-in-place in the cartridge 400, can be made from a variety of materials but typically will comprise a foamed polyurethane material molded to an as molded density of not greater than 30 lbs./cubic ft (0.46 g/cc) typically not greater than 15 lbs./cubic ft (0.24 g/cc) and sometimes no greater than 10 lbs./cubic ft (0.16 g/cc). The overall resulting material would typically have a hardness, Shore A, of no greater than 30, typically no greater than 25 and often within the range 12-20. It is noted that within in some applications, alternate densities and hardnesses can be used. However, the ranges stated will be typical, for many applications.

As described, side panels 410*a*, 411*a*, will typically be molded-in-place, although in alternate constructions in panel 410*a*, 411*a*, can comprise pre-molded parts, to which the media pack is sealed by potting. Molded-in-place arrangements will be convenient, as they ensure sealing at edges of media strips.

Housing seal arrangement 405 will also typically comprise a polyurethane material; typically an analogous material to that described for the panels 410*a*, 411*a*.

Typically the housing seal arrangement 405 would be molded-in-place, after the panels 410*a*, 411*a*, are positioned in the cartridge 400.

A variety of dimensions for filter cartridge can be utilized, in arrangement according to the present disclosure. For an example system, a distance between inlet face 401 and out 402 is about 300 mm; the housing; two parallel sides of the trapezoidal shaped inlet face are about 367 mm and 104 mm respectively; and, the length of an edge perpendicular to the parallel sides is about 350 mm.

The thickness between compression surfaces 452, 453, FIG. 12, is about 16 mm; and surface 451 is spaced the distance of about 27.5 mm from panel for 410*a*.

Other dimensions for an example can be developed from scale.

IV. General Review

It is noted that a variety of features and techniques that can implemented in filter cartridges and air cleaners are described herein. There is no specific requirement that all of the features described be incorporated in a selected assembly, to obtain advantage of features according to the present disclosure.

A new air filter cartridge is described. The cartridge includes a media pack having first and second, opposite, flow faces; a first pair of opposite sides; and, a second pair of opposites. The media pack generally comprises a stack of strips of single facer media material, each strip including a fluted media sheet secured a facing media sheet and oriented with flutes of each fluted sheet extending in a direction between the first and second opposite, flow faces. It is note that there is no specific requirement that the flutes extend continuously and completely between the opposite flow faces. In general, an appropriate internal seal arrangement is provided within the media pack, to ensure that air entering the first (inlet) flow face must pass through the media before exiting from the second, outlet, flow face. This internal seal arrangement can comprise stacking and single facer seals, previously described.

A first pair of opposite sides comprises first and second sides extending between the first and second flow faces and engaging the first flow faces along first and second edges. The first edge has a different length then the second edge. Further, the second pair of opposite side comprises third and fourth sides extending between the first and second opposite flow faces and also between the first and second sides. The second pair of opposite side engages the first flow face along third and fourth edges.

An example air filter cartridges is described having first and second molded-in-place side panels with the first and second side of the media pack embedded therein. Further, perimeter housing seal arrangement is provided extending around the media pack. The housing seal arrangement typically molded-in place, and also extends over the molded-in-place side panels.

For an example provided, the first side extends in a plane non-parallel to the second side. Also an example provided that the third edges is shorter than the fourth edge, and extends generally such that the first side is in a plane generally parallel with a fourth side.

In one example, the third side comprises an exposed fluted media sheet surface, and the fourth side comprises an exposed facing media sheet and surface. Typically the facing media sheet of each single facer strip comprises a non-fluted sheet.

Typically, the first and second side each have panels, covering at least 70%, typically at least 80% and usually at 90% of the associated side. An example characterized, of side panels cover the associate side completed except for a recess region of 5 mm to 10 mm wide, adjacent an inlet flow face of the cartridge.

Typically, the media pack will have the entire portion of the first side between housing seal arrangement and the outlet flow face embedded in the first side panel, and an entire portion of the second side between the housing seal arrangement and the outlet flow face embedded in the second side panel.

In alternate characterization, and air filter cartridge is provided which comprises a media pack having first and second opposite flow faces; the media pack comprising a stack strips of single facer filter material as described. The first flow face comprises a generally planar inlet flow face with a non-rectangular perimeter shape, typically a trapezoidal perimeter shape. A particular trapezoidal perimeter shape shown is one in which there are four side edges comprising: a first pair of opposite edges which extend generally non-parallel to one another and which are of different lengths; and second pair of opposite edges which extend between the first pair of opposite edges and which are of non-parallel to, and of different length from, each other. A first one of the first pair of edges generally extends perpendicularly to the first pair of edges. An internal angle which forms a "slanted" side of the trapezoid, is typically at least 40° usually within the range of 40° to 70°.

Also according to the present disclosure an air cleaner assembly is provided. The assembly includes a housing base. The base includes a perimeter wall and an end wall; the housing base defining an access opening opposite the housing end wall. The housing base includes an inlet section and an outlet section, each surround by the perimeter wall. A portion of the perimeter wall surrounding the inlet section includes at least one air flow inlet therein and the housing has an air flow outlet therein. The access cover is removably mounted on the housing base, to close the access opening. The access cover includes an outer closed panel; an inner pressure flange; and, a side or perimeter edge in extension between the outer closed panel and the inner pressure flange. In example, the outer closed panel has a perimeter which larger than the perimeter side. The access cover is positioned in the housing with the outer closed panel cover closing the access opening in the base and the pressure flange and side surrounded by the inlet section of the housing.

A portion of the side or perimeter arrangement is overlapped by the air flow inlet in the housing base. At least a portion of the perimeter arrangement overlapped by the air flow inlet has air flow apertures therethrough.

It is noted that more than one flow inlet aperture can be provided in the housing base, if desired. In some instances more than one can be provided, with all but one closed off in normal use, an option being too close to any one not oriented where inlet duct work is located.

The air cleaner assembly includes an air filter cartridge operationally positioned within the air cleaner base. The cartridge comprises a media pack having opposite inlet and outlet flow faces comprising a stack of single facer media material as described. The perimeter housing seal arrangement extends around the media pack. For filter cartridge is positioned within the housing base with the perimeter housing seal arrangement pressed between a pressure flange in the access cover and a portion of the housing base. Further, the inlet flow face of the media pack is positioned in the housing inlet section at a location between the air flow inlet and the housing outlet section.

In an example shown, the housing outlet section has a smaller outer perimeter than the housing inlet section; and, the housing perimeter wall defines a trapezoidal perimeter shape in each of the housing outlet section and the housing inlet section. Further, the air filter cartridge is generally trapezoidal.

Typically at least 60% of the length in the media pack is contained within the outlet section of the housing base.

What is claimed is:

1. An air cleaner assembly comprising:
   (a) a housing base;
      (i) the housing base including a perimeter wall and an end; the housing base defining an access opening opposite the housing end;
      (ii) the housing base having an inlet section and an outlet section;
      (iii) a portion of the inlet section including an aperture arrangement therethrough; and,
      (iv) the housing having an air flow outlet therein;
   (b) an access cover removably mounted on the housing base;
      (i) the access cover including: an outer cover; a pressure flange; and a side arrangement extending between the outer cover and the pressure flange; the access cover being positioned on the housing base with the outer cover extending across the access opening in the base;
      (ii) a portion of the side arrangement on the access cover projecting into the housing base to a location surrounded by the housing base and to a location being overlapped by the aperture arrangement through the housing base; at least the portion of the side arrangement on the access cover which is overlapped by the aperture arrangement in the inlet section of the housing base having an access cover side arrangement aperture arrangement therethrough; and;
   (c) an air filter cartridge operably positioned within the air cleaner; the air filter cartridge comprising;
      (i) a media pack having opposite inlet and outlet flow faces and comprising fluted media secured to a facing media oriented with flutes of the fluted media extending in a direction between the first and second, opposite flow faces; and,
      (ii) a housing seal arrangement;
      (iii) the air filter cartridge being positioned in the housing with the housing seal arrangement being pressed by the pressure flange on the access cover against a portion of the housing base.

2. An air cleaner assembly according to claim 1 wherein:
   (a) each of the inlet section and outlet section, on the housing base, is surrounded by the perimeter wall of the housing base; and,
   (b) the portion of the perimeter wall surrounding the inlet section includes the aperture arrangement, on the inlet section of the housing base, therethrough.

3. An air cleaner assembly according to claim 1 wherein:
   (a) the media pack comprises a stack of strips of media material.

4. An air cleaner assembly according to claim 1 wherein:
   (a) the aperture arrangement through a side arrangement of the access cover comprises a plurality of apertures.

5. An air cleaner assembly according to claim 1 wherein:
   (a) the housing seal arrangement defines a shape having multiple, straight, side sections.

6. An air cleaner assembly according to claim 5 wherein:
   (a) the housing seal arrangement defines a non-rectangular shape.

7. An air cleaner assembly according to claim 1 wherein:
   (a) the housing seal arrangement includes a compression portion engaged by the pressure flange on the access cover;
   (b) the housing seal arrangement is configured to define a gap between the compression portion and the media pack; and,
   (c) the housing base includes a flange projecting into the gap between the compression portion of the housing seal arrangement, and the media pack.

8. An air cleaner assembly according to claim 7 wherein:
   (a) the housing base includes a housing base pressure flange portion against which the compression portion is pressed by the compression flange on the access cover;
      (i) the housing base pressure flange portion having a bead projection thereon pressed into the compression portion of the housing seal arrangement.

9. An air cleaner assembly according to claim 8 wherein:
   (a) the bead projection is a continuous bead in extension around the cartridge.

10. An air cleaner assembly according to claim 8 wherein:
    (a) at least 60% of a depth of the media pack between the inner and outlet flow faces is positioned on a downstream side of the housing seal arrangement.

11. An air cleaner assembly according to claim 10 wherein:
    (a) the housing seal arrangement defines a non-rectangular shape.

12. An air cleaner assembly according to claim 1 wherein:
    (a) the media pack includes a protective covering over a side thereof.

13. An air cleaner assembly according to claim 1 wherein:
    (a) the housing seal arrangement is recessed from the inlet flow face toward the outlet flow face.

14. An air cleaner assembly according to claim 13 wherein:
    (a) at least 60% of a depth of the media pack between the inlet and outlet flow faces is positioned on a downstream side of the housing seal arrangement.

15. An air cleaner assembly according to claim 1 wherein:
    (a) the aperture arrangement through the inlet section of the housing base is a single air flow inlet aperture in the perimeter wall of the housing base.

16. An air cleaner assembly according to claim 1 wherein:
    (a) the aperture arrangement through the inlet section of the housing base comprises multiple apertures, at least one of which is closed.

17. An air cleaner assembly according to claim 1 wherein:
    (a) the housing seal arrangement has a constant cross-section around the media pack.

18. An air cleaner assembly according to claim 1 wherein:
    (a) the housing seal arrangement is a molded-in-place arrangement on the cartridge.

19. An air cleaner assembly according to claim 18 wherein:
    (a) the inlet flow face is planar.

20. An air cleaner assembly according to claim 1 wherein:
    (a) the housing seal arrangement is a molded-in-place arrangement on the cartridge;
    (b) the inlet flow face is planar;
    (c) the housing seal arrangement includes a compression portion;

(d) the housing base includes a housing base pressure flange portion against which the compression portion is pressed by the compression flange on the access cover;
(e) the housing seal arrangement is configured to define a gap between the compression portion and the media pack; and,
(f) the housing base includes a flange projecting into the gap between the compression portion of the housing seal arrangement, and the media pack.

* * * * *